US008781153B2

(12) United States Patent
Sharma et al.

(10) Patent No.: US 8,781,153 B2
(45) Date of Patent: Jul. 15, 2014

(54) METHOD, SYSTEM, AND COMPUTER-ACCESSIBLE MEDIUM FOR AUTHENTICATION OF PAPER USING A SPECKLE PATTERN

(75) Inventors: Ashlesh Sharma, Redmond, WA (US); Lakshminarayanan Subramanian, New York, NY (US); Eric A. Brewer, Mill Valley, CA (US)

(73) Assignee: New York University, New York, NY (US)

(*) Notice: Subject to any disclaimer, the term of this patent is extended or adjusted under 35 U.S.C. 154(b) by 757 days.

(21) Appl. No.: 12/996,610

(22) PCT Filed: Jun. 5, 2009

(86) PCT No.: PCT/US2009/046493
§ 371 (c)(1),
(2), (4) Date: Apr. 27, 2011

(87) PCT Pub. No.: WO2009/149408
PCT Pub. Date: Dec. 10, 2009

(65) Prior Publication Data
US 2011/0194737 A1    Aug. 11, 2011

Related U.S. Application Data

(60) Provisional application No. 61/059,141, filed on Jun. 5, 2008.

(51) Int. Cl.
*G06K 9/00* (2006.01)
(52) U.S. Cl.
USPC .......................................... 382/100; 340/5.86

(58) Field of Classification Search
CPC ..... G06K 9/00577; G07D 7/12; G07D 7/124; G07D 7/20; G07D 7/20025; G07D 7/2033
USPC .............. 382/100, 135, 137; 356/71; 340/5.8, 340/5.86
See application file for complete search history.

(56) References Cited

U.S. PATENT DOCUMENTS

| 7,251,347 B2 | 7/2007 | Smith ........................ 382/108 |
| 2002/0012447 A1 | 1/2002 | Amidror et al. ............. 382/100 |
| 2005/0127187 A1 | 6/2005 | Auslander et al. ............ 235/491 |
| 2005/0281434 A1 | 12/2005 | Handley et al. ............... 382/100 |
| 2007/0028093 A1* | 2/2007 | Cowburn et al. ............. 713/155 |
| 2008/0002243 A1* | 1/2008 | Cowburn ..................... 358/498 |
| 2011/0096955 A1* | 4/2011 | Voloshynovskiy et al. ... 382/103 |

FOREIGN PATENT DOCUMENTS

GB   2 221 870 A  *  2/1990  ............. B42D 15/02
WO   WO 03/030105 A2   4/2003

* cited by examiner

*Primary Examiner* — Andrew W Johns
(74) *Attorney, Agent, or Firm* — Andrews Kurth LLP

(57) ABSTRACT

An exemplary methodology, procedure, system, method and computer-accessible medium can be provided for authenticating a portion of a non-digital medium for a document, by receiving at least one image of at least one first marked portion of the non-digital medium for the document, extracting at least one first speckle pattern of the at least one first marked portion, and comparing the first speckle pattern of the at least one first marked portion with at least one second speckle pattern relating to the non-digital medium to determine if a similarity between the first and second speckle patterns equals or exceeds a predetermined amount.

63 Claims, 16 Drawing Sheets

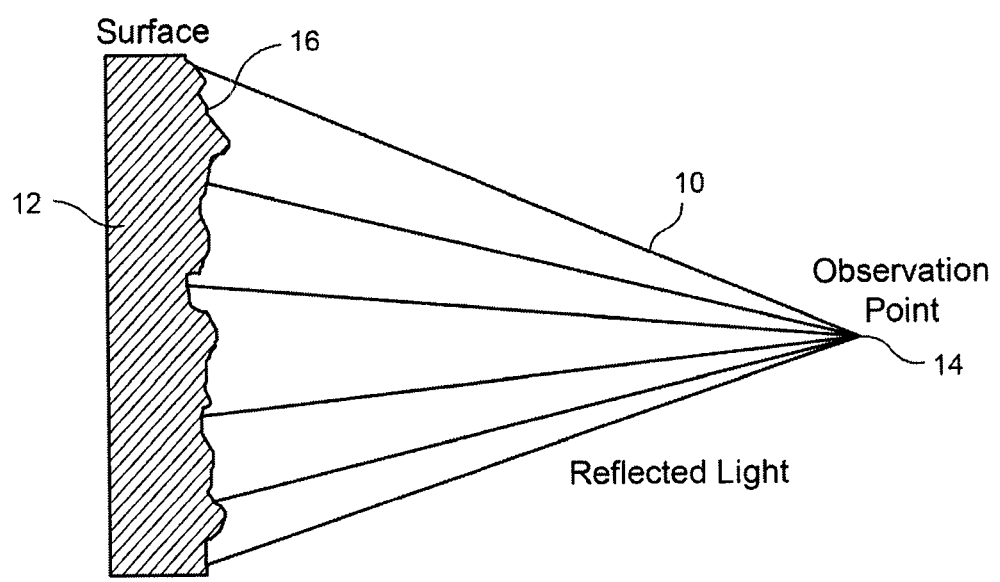
F I G. 1

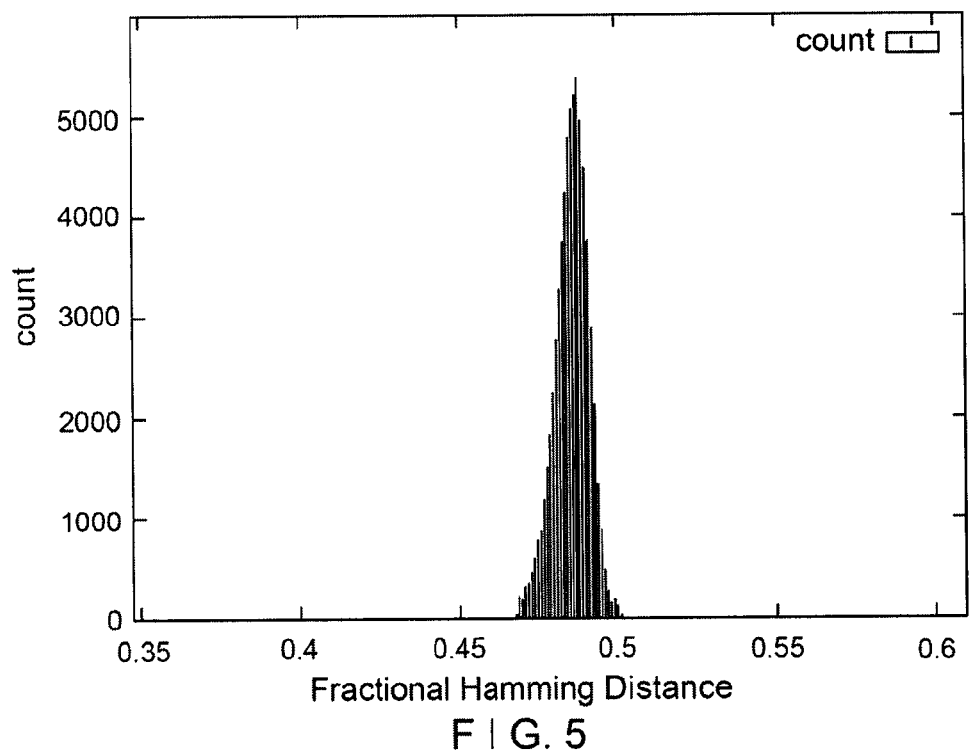
F I G. 5
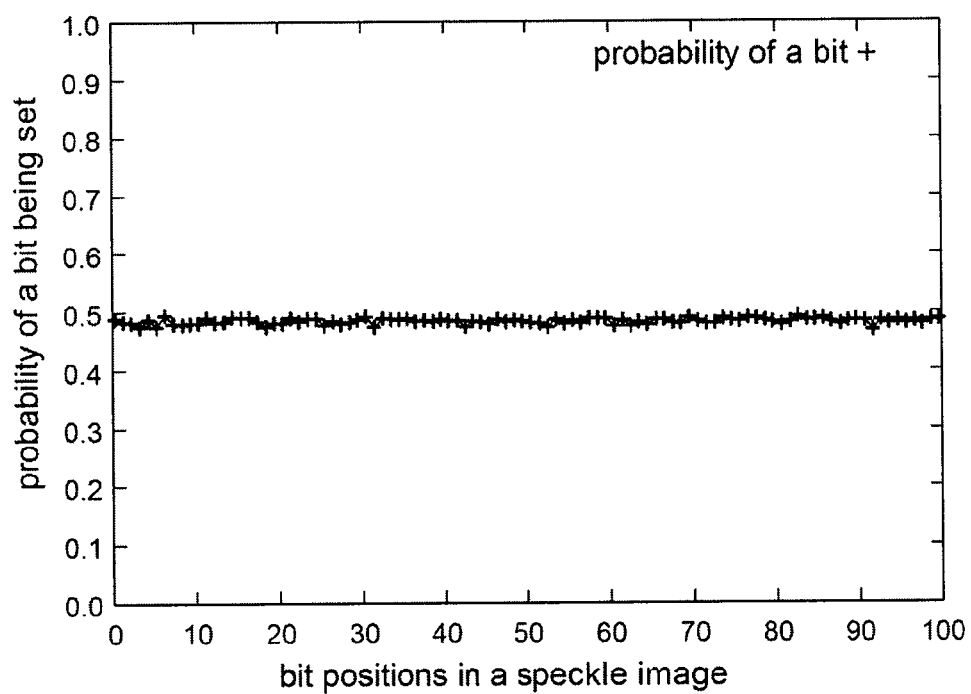
F I G. 6

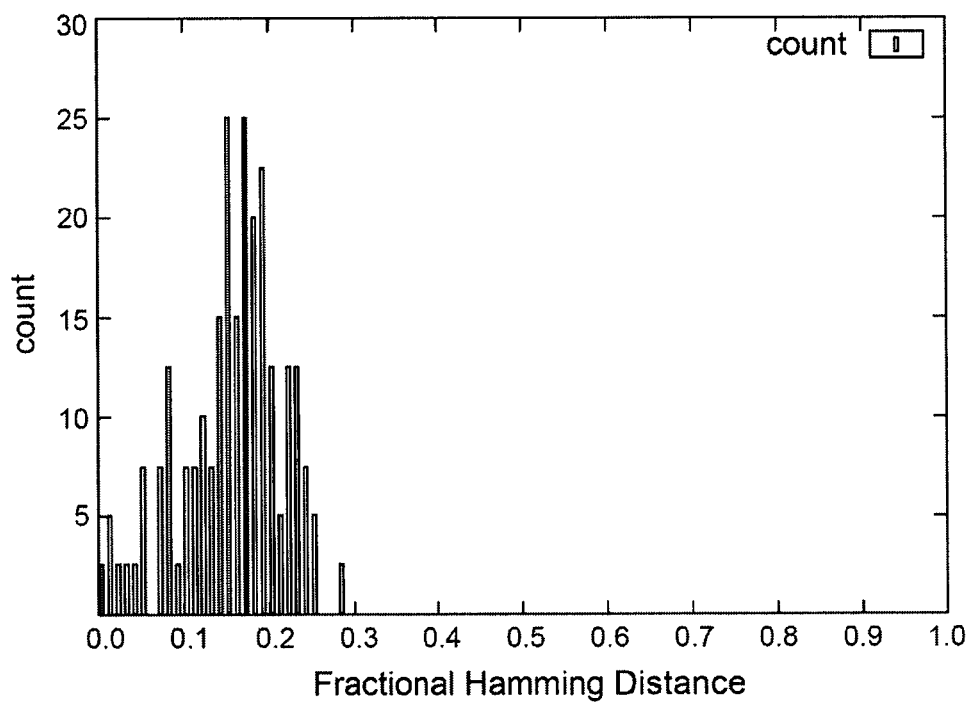
F I G. 7
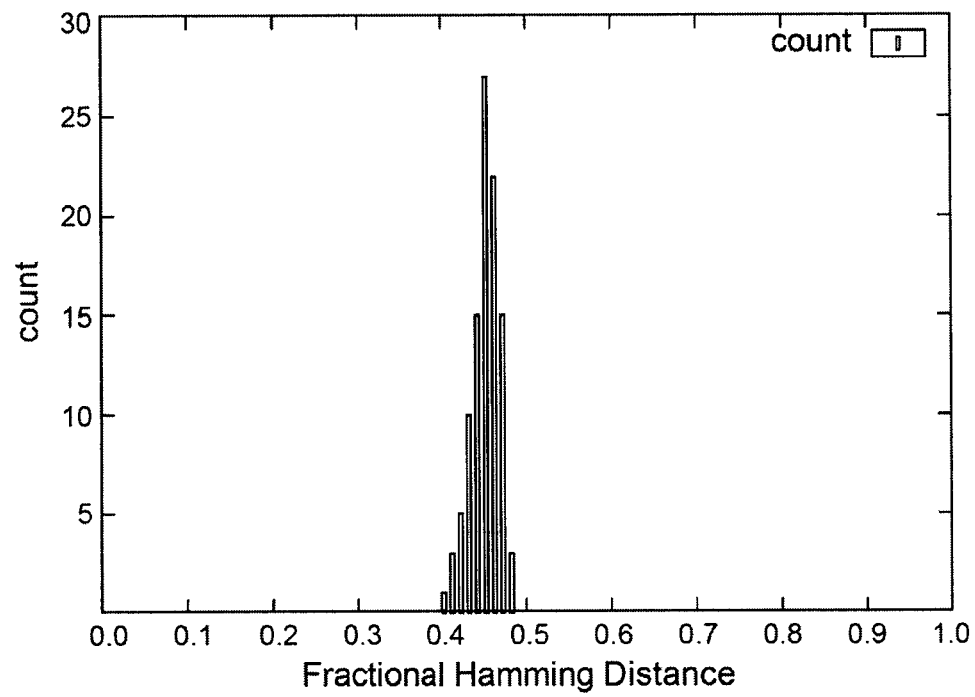
F I G. 8

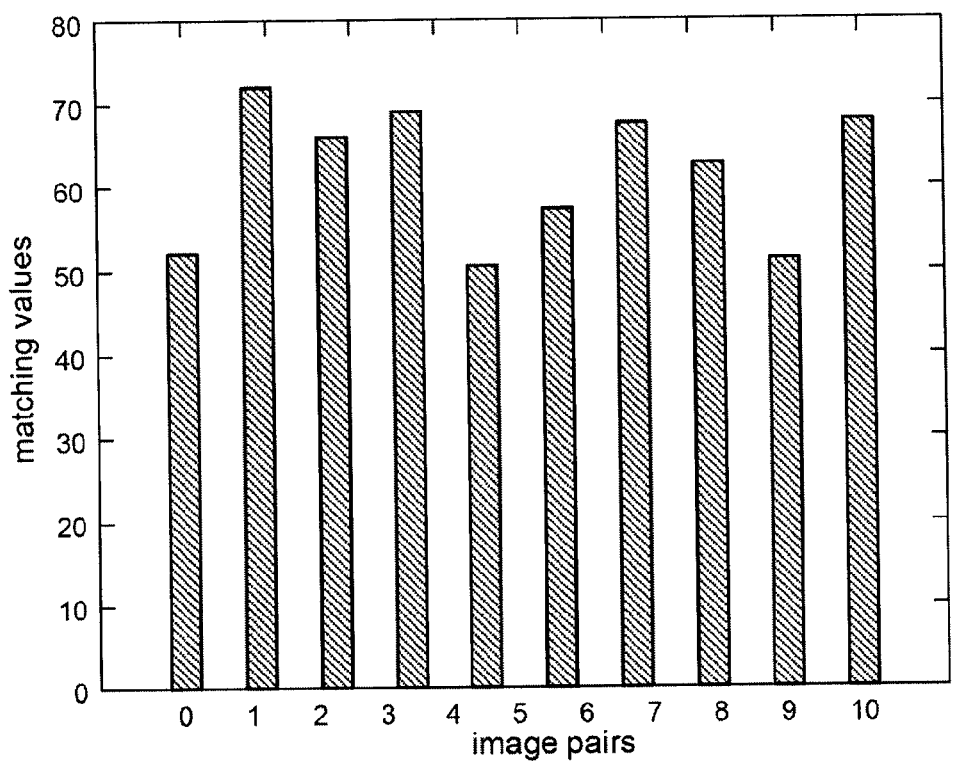
F I G. 13

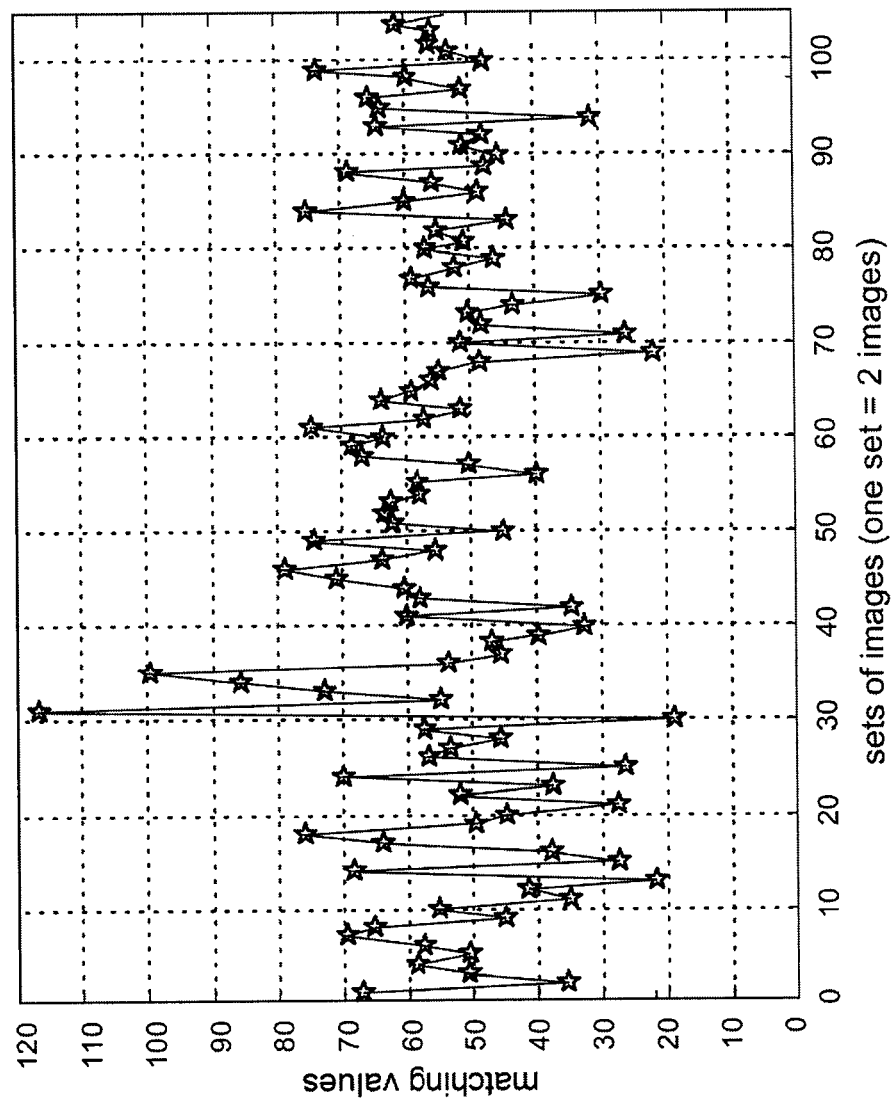
F I G. 14

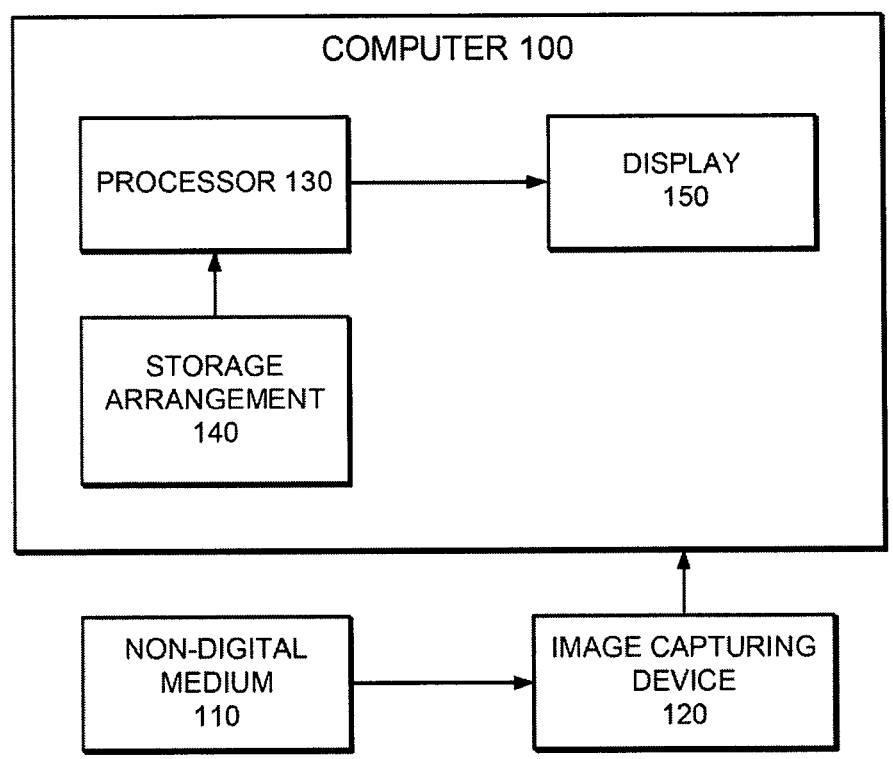
F I G. 20

US 8,781,153 B2

METHOD, SYSTEM, AND COMPUTER-ACCESSIBLE MEDIUM FOR AUTHENTICATION OF PAPER USING A SPECKLE PATTERN

CROSS-REFERENCE TO RELATED APPLICATIONS

The present application is a U.S. National Phase of International Application PCT/US2009/046493 filed Jun. 5, 2009, and also relates to and claims priority from U.S. Patent Application Ser. No. 61/059,141 filed Jun. 5, 2008, the entire disclosures of which are hereby incorporated herein by reference in their entireties.

FIELD OF THE DISCLOSURE

The present disclosure relates to exemplary embodiments of system, method and computer-accessible medium for the authentication of paper using a speckle pattern.

BACKGROUND INFORMATION

Forgery of paper documents has been a major cause of corruption in several countries around the world, especially in developing regions. In these regions, many of the certain essential services such as financial systems, healthcare, governance and land records, completely rely on paper as the basic medium for storing critical information. In addition, these services use paper as the primary source for establishing identity and verifying the authenticity of information. Therefore, any form of mass paper forgery can negatively impact the functioning of essential services and affect large populations.

There have been a variety of paper watermarking solutions that have been proposed to deal with the problem of paper forgery. One prior approach is to manufacture watermarked paper that uses a special form of paper or ink material that is hard to reproduce. Another conventional approach is to use different types of lithography techniques to embed a unique watermark in paper that would be hard to remove or duplicate. One problem with both of these approaches is that all they can require expensive machinery or access to specialized paper (which can be limited and expensive). In addition, the paper and inks used in some of these techniques are likely specially prepared (using physical or chemical means) and these are often not readily available in the market.

While these watermarking techniques can offer certain security properties, they have part basic limitations that constrain their use to specific application areas such as producing currency notes, checks and official paper for government records. First, these watermarking techniques are likely expensive; hence, these techniques may not be affordable for low-cost applications such as micro-finance, healthcare projects run by small institutions or corporations which lack purchasing power. Second, these watermarking techniques embed the same watermark across a bulk collection of documents (e.g., currency notes, checks, official paper). Thus, watermarked documents of the same type are generally indistinguishable from each other. In many common applications (healthcare, finance, etc.) which use paper-based records, it can be important to distinguish individual paper documents from each other. While standard bar-coding techniques can embed a unique code into each paper, such codes can easily be reproduced and duplicated.

A paper watermarking technique of fiber fingerprinting describes using a natural randomness embedded within the fiber structure of paper to extract a unique watermark. A paper watermarking technique of a print signature describes how to use randomness in the manner in which characters are printed by a laser printer to extract a unique signature for a particular printed copy.

While both these techniques can be low cost and may provide paper distinguish ability, they have certain shortcomings which can limit their use in developing region settings. Paper-based documents are very poorly maintained in developing regions and can easily get damaged due to a variety of factors, e.g., bad storage environments, damage due to rain, crumpling of watermarked area and/or aging of the paper. The fiber fingerprints within a marked region can become badly affected when paper is damaged. Similar to the fiber structure, the print in paper can deteriorate over time or can be affected when paper gets damaged.

The print signature generally relies on the imprecision of the printers to extract its signatures; when printing technology advances, the randomness we believe tends to reduce, limiting its applicability. In addition, any paper watermarking mechanism that relies on natural properties of paper would likely operate on magnified images of small regions within the paper. Therefore, for proper watermarking, it may be important to carefully extract the image from paper.

Thus, it can be desirable to provide exemplary embodiments of method, system and computer accessible medium for providing a low cost paper water marking technique that avoids the problems encountered by the techniques in the prior art as set out above.

SUMMARY OF EXEMPLARY EMBODIMENTS OF DISCLOSURE

At least some of the above described problems can be addressed by exemplary embodiments of the system, method and computer accessible medium according to the present disclosure. For example, using such exemplary embodiments, it is possible to provide a method for authenticating a portion of a non-digital medium for a document, comprising receiving at least one image of at least one first marked portion of the non-digital medium for the document, extracting at least one first speckle pattern of the at least one first marked portion, and using a computer arrangement, comparing the first speckle pattern of the at least one first marked portion with at least one second speckle pattern relating to the non-digital medium to determine if a similarity between the first and second speckle patterns equals or exceeds a predetermined amount.

The computer arrangement can compare the first speckle pattern data with the second speckle pattern using a predetermined procedure. The predetermined procedure can comprise a combination of a Gabor transform and a Principal Component Analysis, or can comprise an object recognition algorithm that identifies local and global descriptors in an image.

The method can further comprise converting the at least one first speckle pattern into first data and the at least one second speckle pattern into second data using a Gabor transform procedure. The first data can be compared to the second data using a fractional hamming distance to determine the similarity.

The speckle pattern can comprise a unique watermark. The speckle pattern can comprise a random intensity pattern produced by a mutual interference of coherent wavefronts that are subjectable to at least one of phase differences or intensity fluctuations. The image can comprise at least some amount of electro-magnetic radiation reflected back from the at least one first marked portion of the non-digital medium. The amount of electro-magnetic radiation can have different optical lengths. The first marked portion can be marked by a marking device, which can comprise at least one of one of a marker, a pen, an ink-containing device or a paper printing device.

The method can further comprise exposing the first marked portion to one of an ambient light or a partially monochromatic coherent light to obtain a scattered speckle pattern of the at least one first marked portion, wherein the at least one second speckle pattern is based on the scattered speckle pattern. The at least one first speckle pattern and the at least one second speckle pattern can be comparable irrespective of an orientation of the non-digital medium.

The predetermined amount can be determined based on a mathematical function. The at least one image of the at least one first marked portion can be obtained using a microscope arrangement. The microscope arrangement can be integrated into a handheld device having at least one processing function. The microscope arrangement can be at least one of a Universal Serial Bus microscope, a digital camera integrated with a microscope or a cellular telephone integrated with a microscope.

The non-digital medium can include a paper, wherein the at least one image is received from the paper which is at least one of crumpled or wrinkled in a proximity of the at least one first marked portion of the paper. The at least one image can be received from the non-digital medium which came in contact with a liquid in a proximity of the at least one first marked portion. The non-digital medium can comprise an aged paper document.

The method can further comprise generating a one-way hash key as a function of one or more features of the at least one first speckle pattern. The method can further comprise encrypting the one-way hashed key using a cryptographic key. The method can further comprise authenticating the non-digital medium with the encrypted key so as to identify that the non-digital medium is from to an authentic source by using a master cryptographic secret key of the authentic source.

The at least one first speckle pattern can be obtainable for different marked portions of the non-digital medium taking into consideration fault tolerance and tamper resistance. The method can further comprise storing the at least one second speckle pattern as predetermined data in the computer arrangement before comparing the at least one first speckle pattern to the at least one second speckle pattern to determine the similarity. The non-digital medium can be at least one physical paper.

Using such exemplary embodiments, it is also possible to provide a system for authenticating a portion of a non-digital medium for a document, comprising a receiving arrangement configured to receive at least one image of at least one first marked portion of the non-digital medium for the document, and a computing arrangement configured to extract at least one first speckle pattern of the at least one first marked portion of the non-digital medium, and compare the at least one first speckle pattern with at least one second speckle pattern relating to the non-digital medium to determine if a similarity between the first and second speckle patterns equals to or exceeds a predetermined amount.

The system can further comprise a marking arrangement configured to mark the at least one first portion of the non-digital medium. The marking arrangement can comprise at least one of one of a marker, a pen, an ink-containing device or a paper printing device. The system can further comprise a storage arrangement configured to store the at least one second speckle pattern. The computing arrangement can compare the first speckle pattern data with the second speckle pattern using a predetermined procedure.

Using such exemplary embodiments, it is also possible to provide a computer-accessible medium for authenticating at least one portion of a non-digital medium for a document, the computer-accessible medium including instructions thereon, wherein, when a computing arrangement executes the instructions, the computing arrangement is configured to perform procedures comprising receiving at least one image of at least one first marked portion of the non-digital medium for the document, extracting at least one first speckle pattern of the at least one first marked portion, and using a computer arrangement, comparing the first speckle pattern of the at least one first marked portion with at least one second speckle pattern relating to the non-digital medium to determine if a similarity between the first and second speckle patterns equals or exceeds a predetermined amount.

Using such exemplary embodiments, it is also possible to provide a system for authenticating at least one portion of a non-digital medium for a document, comprising an imaging device configured to obtain an image of at least one first marked portion of the non-digital medium for the document, and a processing device with a processor configured to extract at least one first speckle pattern of the at least one first marked portion of the non-digital medium, and compare the at least one first speckle pattern with at least one second speckle pattern relating to the non-digital medium to determine if a similarity between the first and second speckle patterns equals to or exceeds a predetermined amount.

The processing device can further comprise a memory for storing the second speckle pattern relating to the non-digital medium. The system can further comprise a marking device for marking the at least one first marked portion of the non-digital medium for the document. The processing device can be a handheld device or computer. The processing device can be a handheld device that can be at least one of a cellular phone, a cellular phone integrated with a microscope, a digital camera integrated with a microscope, a smart phone, a personal digital assistant or a laptop.

A random number can be derived from a mathematical function is imprinted in the at least one first marked portion of the non-digital medium for the document. An authentication of the at least one first marked portion of the non-digital medium for the document can be established by deriving the random number from a one-way hash function. The random number can be derived based on a private key or a public key stored in the processing device.

An expiration date can be stored in the at least one first marked portion of the non-digital medium for the document. The processing device can detect the expiration date stored in the non-digital medium for the document. The non-digital medium can be at least one physical paper.

Using such exemplary embodiments, it is also possible to provide a system for determining an authenticity of a paper document, comprising a paper comprising a speckle pattern in a marked portion in the paper, an imaging device configured to obtain an image of at least the marked portion in the paper, and a processing device configured to extract the speckle pattern of the marked portion in the paper.

The system can further comprise a communication interface that transmits data pertaining to the paper. The paper further can comprise unique identity information about the paper. The unique identity information can comprise a random number derived from a mathematical function, and the random number is imprinted in the paper. An authentication of the paper can be established by deriving the random number from a one-way hash function. The paper can be proven as authentic by deriving the random number based on a public key stored in the processing device.

The system can comprises a disconnected authentication that uses pre-determined data stored in a memory of the device. The disconnected authentication can detect an expiration date of the paper. The disconnected authentication is independent of any centralized authentication system. The processing device can be further configured to compare transmitted data with pre-determined data related to the paper.

The system can further comprise a remote processor for authenticating the paper by comparing features from the paper and the speckle pattern from the marked portion of the paper with pre-determined data corresponding to the paper to determine an authenticity of the paper. The paper can be remotely authenticated or tracked and can be incorporated with any physical object. The processing device can remotely track the paper by storing the identity and speckle pattern from the paper as the paper traverses different physical locations. The data pertaining to the paper can be compressed using a mathematical function before the communication interface transmits the data to a remote device. The data can comprise features extracted from the speckle pattern of the marked portion of the paper. The system can be offline. The system can be a supply chain management system. The system can individually authenticate the flow of each paper in a supply chain management system.

Using such exemplary embodiments, it is also possible to provide a method for authenticating at least one portion of a non-digital medium for a document, comprising, obtaining an image of at least one first marked portion of the non-digital medium for the document, extracting at least one first speckle pattern of the at least one first marked portion of the non-digital medium, and comparing the at least one first speckle pattern with at least one second speckle pattern relating to the non-digital medium to determine if a similarity between the first and second speckle patterns equals to or exceeds a pre-determined amount.

Using such exemplary embodiments, it is also possible to provide a method for determining an authenticity of a paper, comprising obtaining an image of a marked portion of the paper, extracting a speckle pattern in the marked portion of the paper, and recording the speckle pattern and storing the speckle pattern in order to verify an authenticity of the paper.

The method can further comprise comparing the speckle pattern with pre-determined data to determine if a similarity between the speckle pattern and pre-determined data exists in order to determine the authenticity of the paper.

These and other objects, features and advantages of the present disclosure will become apparent upon reading the following detailed description of embodiments of the present disclosure, when taken in conjunction with the appended claims.

BRIEF DESCRIPTION OF THE DRAWINGS

The foregoing and other exemplary objects of the present disclosure will be apparent upon consideration of the following detailed description, taken in conjunction with the accompanying exemplary drawings and claims, in which like reference characters refer to like parts throughout, and in which:

FIG. 1 is an illustration of an illustration of an electromagnetic radiation (e.g., right rays) reflecting from a portion of a paper surface;

FIG. 5 is an illustration of an exemplary graph of a Fractional Hamming Distance of different speckle bits;

FIG. 6 is an illustration of an exemplary graph showing a probability of a bit being set in an exemplary Gabor bit sequence;

FIG. 7 is an illustration of an exemplary graph showing a Fractional Hamming Distance of 200 exemplary like speckle bits;

FIG. 8 is an illustration of an exemplary graph showing a Fractional Hamming Distance of 100 exemplary like speckle bits that are tampered;

FIG. 13 is an illustration of an exemplary graph giving matching values for tampered speckles;

FIG. 14 is an illustration of an exemplary graph showing a comparison of same speckles with large radial movement;

FIG. 16b is an illustration of a normal image before undergoing the Gabor transform illustrated in FIG. 16a;

FIG. 20 illustrates a block diagram of an exemplary embodiment of a system according to the present disclosure.

Figure 2A:
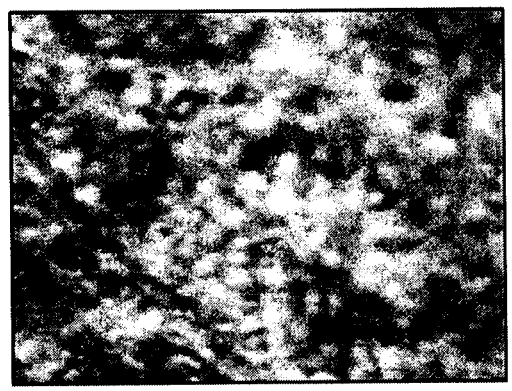
FIGS. 2a-2d are illustrations of images of speckles captured using an exemplary USB microscope.
Figure 2B:
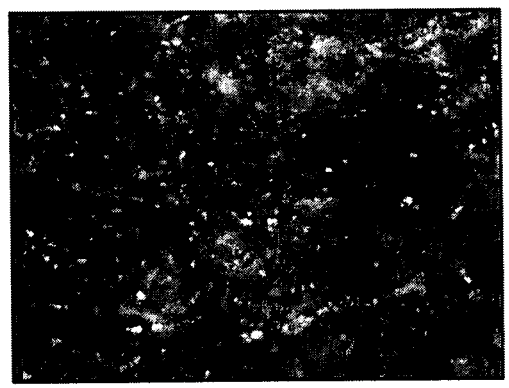
Figure 2C:
Figure 2D:
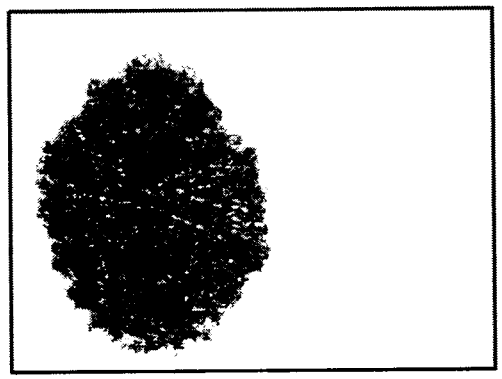

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject disclosure.

DETAILED DESCRIPTION OF EXEMPLARY EMBODIMENTS OF DISCLOSURE

Exemplary embodiments of the methodologies and procedures which can be implemented by the exemplary embodiments of system, method and computer-accessible medium according to the present disclosure will now be described, at least to some extent, with reference to the figures.

Using the exemplary embodiments of the present disclosure, a low-cost, tamper-resistant paper watermarking technique is provided that extracts a unique watermark for a piece of paper based on the natural randomness present in the structure of the paper. Such exemplary low-cost paper-based authentication mechanism and/or procedure can be used for applications in rural regions such as microfinance, healthcare, land ownership records, supply chain services and education which heavily rely on paper based records. Such exemplary embodiments can use, e.g., a random speckle pattern, i.e., a random bright/dark region formation at the microscopic level, when light falls on to the paper, to extract a unique watermark to identify paper.

In certain exemplary embodiments, a repeatable speckle pattern of paper of a small region can be extracted using low-cost machinery involving a paper, pen and a low-cost microscope. A combination of several image processing procedures can be used to compare two or more speckle patterns. Such exemplary techniques and/or mechanisms can produce a robust repeatable watermark even if the paper is damaged due to folding, crumpling, soaking in water/oil or aging with time.

Exemplary Paper Speckles

When light falls onto an object and the scattered light is projected onto a screen, the screen can be speckled with bright and dark regions which represents a speckle pattern. A speckle pattern can be a random intensity pattern produced by the mutual interference of coherent wavefronts that can be subject to phase differences or intensity fluctuations. These speckles can be caused by, e.g., rays scattering from different parts of the illuminated area. At the screen, these rays can have different optical path lengths; therefore, the rays interfere and result in speckles.

As shown in FIG. 1, electro-magnetic radiation, e.g., rays 10 can reflect from different parts of a surface 16 of a paper 12. The surface 16 can be optically rough; thus, the rays 10 can have a different optical path length at the observation point 14, and interference can provide bright and dark regions representing a speckle pattern. Using an exemplary microscope (e.g., with a 10-200× zoom) having an inbuilt LED source, a speckle pattern can be extracted when a specific portion of the paper is focused upon. The speckle pattern can represent a string of dark and bright spots. For example, the speckle pattern can be a crude approximation of how light from the LED gets scattered over a rough surface represented by the fiber structure of the region of the paper focused on.

Exemplary Extraction of Paper Speckle Patterns

Extracting acceptable speckle patterns from a region of paper may not be an easy task due to the following exemplary factors, e.g.,: (a) extracting a good clearly visible speckle pattern can be difficult; and (b) facilitating to repetitively precisely point the microscope to the same 2 mm region can be difficult, especially when done manually. Even minor shifts in a microscope position can make it pinpoint to a completely different region. To facilitate the use of the speckle patterns of the same region as a watermark, variations in position, orientation and lack of precision in speckle pattern extraction should to be tolerated. A robust image comparison procedure that can consider variations of speckle pattern images of the same paper region extracted at different times can be used, which can show that the images are very similar, if not refer to the same paper region.

In an exemplary test, a plain sheet of paper was observed under white light under simple microscopes. While a speckle pattern could be observed through the naked eye, extracting the pattern in digital form is not straightforward since there can be very high variability in the intensity of darkness ranging from bright to different shades of grey to dark regions. To address this problem, a dark colored marker pen can be used to strain a small region with an arbitrary contour, which produced an arbitrary contour shaded region with roughly a 2 mm diameter.

FIG. 2 illustrates exemplary different speckle pattern images extracted using an exemplary microscope. For example, in FIG. 2a, a paper speckle is illustrated on a region of paper without an "ink blob"; in FIG. 2b, a same region of paper is illustrated at 200× magnification; in FIG. 2c, the same region of paper is illustrated at 60× magnification; and in FIG. 2d, an "ink blob" is illustrated with bright lighting to capture more speckles and contour.

Using arbitrary contour shaded regions can be important for several reasons. First, when magnifying a strained region, the contour in the magnified image is fairly random which by itself can act as a signature, since ink strains will not have the same contour as each other. Second, it can be important to have a small shaded region aided in focusing within the same region for repetitive attempts, since the goal would be to have the entire region appear within a microscopic view. Third, having a dark background in the shaded region made the light and dark regions in the speckle pattern clearly distinguishable within the shaded region. The speckle pattern in the captured image was much clearer within the region than outside thereof. Fourth, the arbitrary contour helped in translating and orienting two images of the same region to ease comparison. Fifth, using the arbitrary shaded contour region based speckle pattern can give two forms of "random" signatures, e.g.: (a) the random speckle pattern within the shaded region; and (b) the contour of the shaded region. A combination of these two random patterns can make the watermark generated very hard to forge.

Exemplary Speckle Theory

Classical speckle theory can intuitively show the randomness of paper speckles, and Memory Effect, an exemplary phenomenon of laser speckles, can also be shown by paper speckles.

Exemplary Classical Speckle Theory

Similar to a randomness property observed in laser speckles, paper speckles also satisfy the same level of randomness. A primary difference between an exemplary laser speckle and paper speckle can be that in the exemplary system of the present disclosure, monochromatic partial coherent light (from the LED of the microscope) can be used, unlike a laser's coherent light source.

To illustrate the randomness in exemplary paper speckles, a similar approach can be used to exhibit randomness in laser speckles based on an irradiance function used to measure light intensity. Irradiance can be defined as the power of electromagnetic radiation on a surface, per unit area. For simplicity, it can be assumed that a field incident at (x, y, z) is ideally polarized and ideally monochromatic. Under such conditions, the field at (x, y, z) can be represented by:

$$u(x,y,z;t) = A(x,y,z)e^{3i\pi vt}$$

where v is the optical frequency and A(x, y, z) is a complex phasor amplitude. The irradiance at a given point (x, y, z) can be given by:

$$I(x, y, z) = \lim_{T \to \infty} \frac{1}{T} \int_{-\frac{T}{2}}^{\frac{T}{2}} |u(x, y, z; t)|^2 dt = |A(x, y, z)|^2$$

The complex phasor amplitude of the field can be represented by:

$$A(x, y, z) = \sum_{k=1}^{N} |a_k| e^{i\Phi_k}$$

where ($a_k$) and ($\Phi_k$) represent the amplitude and phase of the contribution from the $k^{th}$ scattering area and N can be the total number of such contributions. For example, the assumption can be that amplitude $a_k$ and the phase $\Phi_k$ of the $k^{th}$ elementary phasor are statistically independent of each other or are uncorrelated to each other. Based on the irradiance function, the speckle pattern can be computed as the set of points (x, y, z) on a surface such that the irradiance I(x, y, z) at these points is above a certain fixed threshold $I_t$.

While computing or determining the exact value of irradiance can be difficult, under certain exemplary realistic assumptions (such as N being large to apply the central limit theorem for law of large numbers), it is possible to approximate the irradiance function to show that: (a) speckles are randomly distributed across any two dimensional surface; and (b) a probability that the irradiance at a given point is above a certain threshold $I_t$ is equal to the following exponential distribution:

$$P(I > I_t) = e^{\frac{-I_t}{\overline{I}}}, I_t \geq 0$$

where $\overline{I}$ represents the mean irradiance.

Applying the same or similar theory to test randomness of paper speckles, given the specific paper speckle pattern, the irradiance at each point in the image using the pixel value can be computed. Hence, given a threshold $I_t$, $P(I>I_t)$ can be computed or determined for a specific value of $I_t$.

Figure 3A:
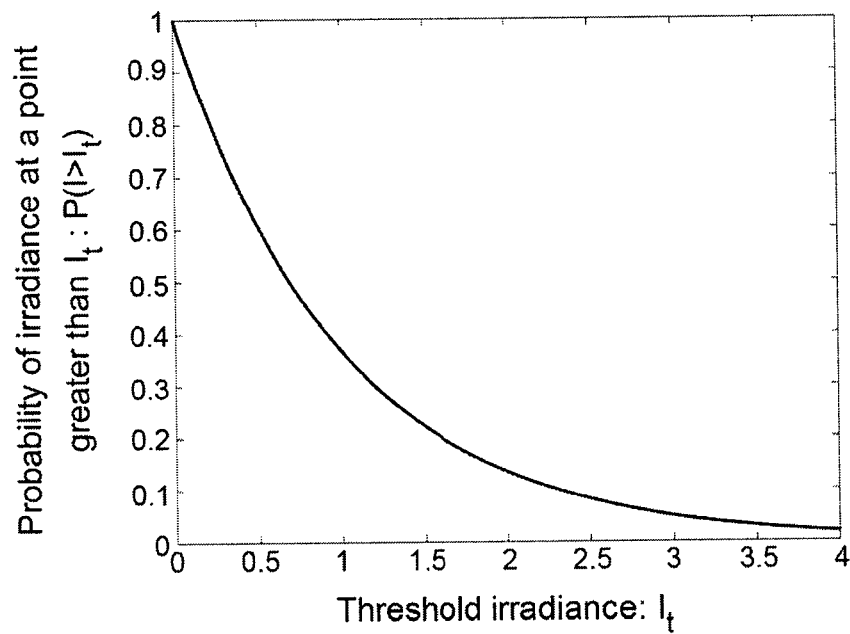
FIGS. 3a and 3b are illustrations of exemplary graphs of a probability of an irradiance.
Figure 3B:
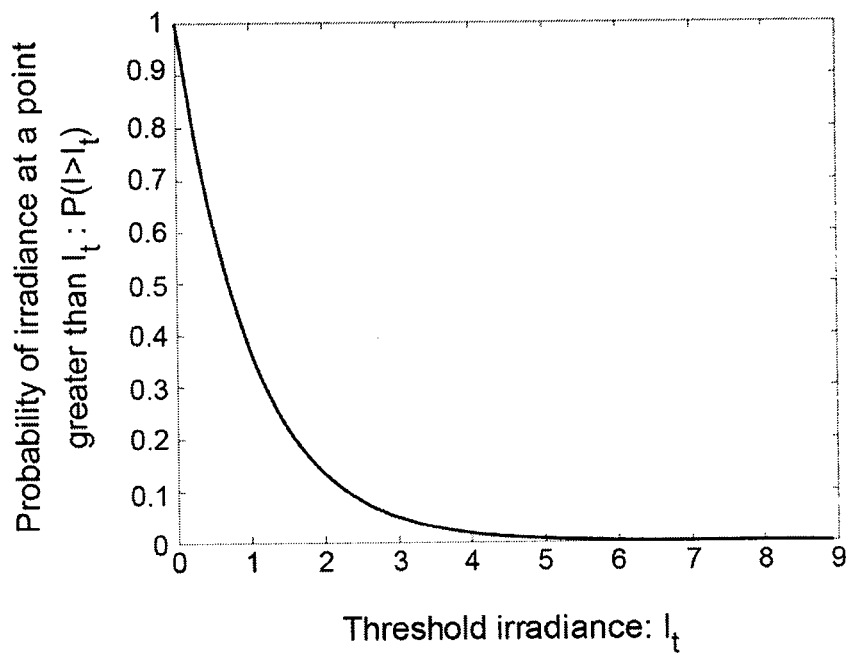
Figure 4A:
FIGS. 4a-4d are illustrations showing a memory effect in paper speckles.
Figure 4B:
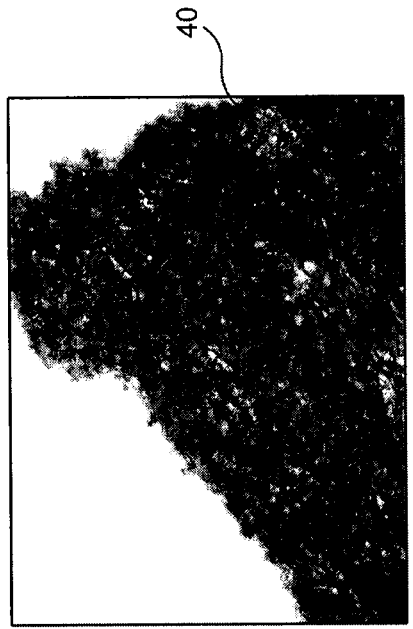
Figure 4C:
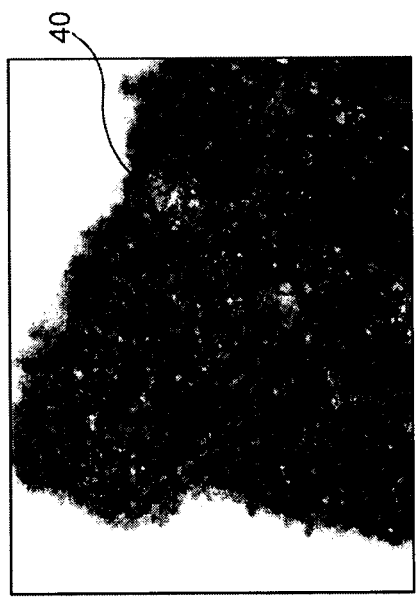
Figure 4D:
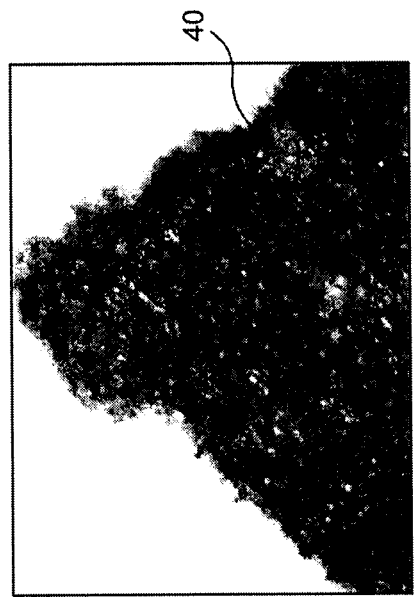

FIGS. 3a and 3b show graphs of an exemplary variation between $P(I>I_t)$ and $I_t$ for two different speckle patterns generated from two different papers. As illustrated in FIGS. 3a and 3b, $P(I>I_t)$ follows an exponential distribution with $I_t$. FIG. 3a illustrates a graph of a probability of irradiance I at a point on the paper speckle, given a threshold $I_t$ and mean I=0.56085229010178, and FIG. 3b illustrates a graph of a probability of irradiance I at a point on a different paper speckle, given a threshold $I_t$ and mean I=0.50010570354907. This exemplary theory can validate and/or confirm that the paper speckle pattern is randomly distributed. This theory was tested across a wide range of images and it was found that the same result held across all of the images that were collected.

Exemplary Memory Effect

In the Exemplary Classical Speckle Theory, it can be assumed that the amplitude $a_k$ and the phase $\square_k$ were uncorrelated. This exemplary assumption can make the classical theory not account for the correlation effects exhibited by speckle patterns. In this section, a property exhibited by paper speckles called memory effect which is generally found in the case of laser speckles, can intuitively show that paper speckles are correlated in a similar fashion to laser speckles.

For example, let a be the direction of the incident beam and b be the direction in which the speckle pattern is being viewed. If the incident beam is rotated by a small angle $\delta\theta$, then intuitively speckle pattern too should rotate by the same angle $\delta\theta$. If the speckles were uncorrelated, (since $\Phi_k$ are uncorrelated), the resulting speckle pattern can completely change from the original one due to change in the incident beam. However, laser speckles generally have a memory effect, where the speckle "remembers" the angle of the incident beam as it is rotated.

According to the exemplary embodiments of the present disclosure, white light can be passed, which is partially coherent from a microscope's LED's, through the paper and multiple scattering occurs which produces speckle patterns. It can be shown that paper speckles too exhibit memory effect as observed in a coherent multiple scattering regime.

FIGS. 4a-4d show exemplary images of an exemplary memory effect in paper speckles. For example, with respect to FIGS. 4a-4d, an exemplary paper speckle is rotated 2-3 degrees each time while taking snapshots of the paper speckle. The circle 40 in FIGS. 4a-4d shows a feature in the speckle pattern that changes and shifts as the paper is rotated, which can indicate the correlation in a partial coherent regime, between the phases of the input and output light, just as observed in the coherent regime.

The exemplary similarity of paper speckles and laser speckles strengthens the assumption that, e.g., many or most of the properties of laser speckles can be applied to paper speckles.

Uniqueness of Speckles

The uniqueness of paper speckles can be shown by comparing large number of speckles using Gabor transforms and statistically estimating their randomness. The entropy of speckles can be estimated by comparing the bitwise mean of large number of speckles, and the tamper resistance property of speckles can be shown.

An exemplary, e.g., two-step process can be used to compare speckles. First, speckle image can be converted into bits using 2-D Gabor transforms. Second, the two speckle bits can be compared using Fractional Hamming Distance (FHD) to check if the speckles are similar or dissimilar.

Exemplary Gabor transforms can be applied to speckle images and bits can be extracted using the complex phase of the Gabor wavelets using the following equations:

$$g(x_0, y_0, f, \theta) = e^{-[\pi(a^2(x-x_0)^2 + b^2(y-y_0)^2)]} e^{[i2\pi f(x \cos\theta + y \sin\theta)]}$$

The first term can be a 2-D Gaussian function located at ($x_Q$, $y_q$) where a can be a width along the x-axis and b can be along the y-axis. The second term can be a complex 2-D sinusoid of frequency f and an orientation defined by $\theta$. These parameters can be varied and Gabor transforms (or filters) can be applied to any location, scale or orientation of an image. The exemplary procedure to extract bits from the Gabor transforms can be stated as follows:

1. Compute the complex phase of the Gabor transform for one orientation and one level.
2. Use the complex phase and apply zero as a threshold to extract a binary sequence or a binary image.
3. Repeat this procedure for various orientations and levels.

The speckle image size can be decreased after each level and level 4 can be chosen to extract bits. Level 4 can be selected because earlier levels may be sensitive to changes in illumination and the process of speckle image registration. The importance of using only the complex phase of the Gabor wavelet to extract bits is that any illumination effects, contrast or poor focus, present in the speckle image can be eliminated. Thus, the extraction of speckle images does not need to be very precise. In addition, mask bits can be computed to remove the extraneous effects surrounding the speckle image. These exemplary mask bits can be used to assist in applying Gabor transforms to only the region within the image where speckles are present.

For an exemplary Fractional Hamming Distance (FHD), let A and B be the sequence of bits extracted from after applying Gabor transforms to two speckle images, and let maskA and maskB be exemplary two mask bits of the respective speckle images. The similarity between two sequence of bits A and B can be computed using the Fractional Hamming Distance:

$$H = \frac{(A \otimes B) \cap maskA \cap maskB}{maskA \cap maskB}$$

A ⊗ B can give a difference between bits and the ∩ with mask bits suppresses the extraneous noise. The exemplary FHD can provide a ratio that can define whether the sequence of bits are either similar or dissimilar: i) ideally 0 would represent equal bits and therefore, a perfect match of the speckles images and ii) the likelihood of 0 or 1 occurring in a bit sequence is equally probable, so 0.5 would represent dissimilar bits and therefore different speckle images.

Exemplary Statistical Independence

The statistical independence of speckles can be shown using Gabor transforms and FHD by comparing 16,000 different speckle images and comparing the results with a binomial distribution of similar parameters. Each speckle image can be of size 160×120 pixels and by applying Gabor transforms we get a 19,200 bit sequence.

FIG. 5 illustrates a graph of exemplary results of comparing 60,000 different speckle images with a mean=0.48705 and a standard deviation=0.00577. Gabor transforms are applied to, e.g., 550 speckle images and their bit sequences are extracted. For example, 150 bit sequences are compared with 400 bit sequences using FHD and the results are tabulated.

The observed mean of FHD was p=0.48705 and standard deviation σ=0.00577. This distribution can correspond to a binomial distribution having $$N = \frac{p(1-p)}{\sigma^2} = 7504$$

degrees of freedom. A value of N=7504 was obtained, indicating that speckle patterns seem to be correlated as in the case of laser speckles. In addition, even if there were no correlations between speckles, applying multiple Gabor filters would introduce correlations.

As per the results, the number of independent bits in the Gabor bit sequence is N=7504, thereby suggesting that there are 7504 independent binary degrees of freedom in the 19200 Gabor bit sequence. Thus, the total number of unique identifiers that can be obtained from paper speckle is about $2^{7504}$. This suggests that a chance of finding the Gabor bit sequence obtained from two distinct paper speckles is approximately about $2^{-7504}$.

Exemplary Speckle Entropy

The entropy of a code with n states can be maximized if all the states are equally likely. The entropy can be given by, $$H = -\sum_{i=1}^{n} p_i \log_2 p_i,$$

where $p_i$ can be the probability of the $i^{th}$ state and for the entropy to be maximized, it can satisfy $$\sum_{1}^{n} p_i = 1.$$

Since, n=2 (binary), $p_i$=0.5. It can be shown that the probability of the bit being set in the Gabor bit sequence by determining the mean of a large number of Gabor bit sequences.

FIG. 6 illustrates a graph showing a probability of a bit being set in a Gabor bit sequence of a paper speckle is almost 0.5, which can correlate with the theoretical argument suggesting that Gabor bit sequence of paper speckles is a maximized entropy code.

Exemplary Like Speckles

The exemplary embodiments of the present disclosure also describe exemplary results of identifying "like" speckle patterns, e.g., paper speckle patterns that are obtained from a same spot of the paper.

For example, FIG. 7 illustrates a graph of an exemplary FHD for 200 Gabor bit sequences of "like" speckles, with mean=0.16751 and standard deviation=0.05948. The exemplary FHD distribution can ideally be zero, as these speckle patterns are the same. However, due to high sensitivity, the FHD's are not zero. An exemplary speckle pattern extracted with same orientations and lighting conditions, never produce identical Gabor bit sequences, due to sensitivity of speckles to minute changes in the physical environment.

Exemplary Tamper-Resistance

An exemplary Gabor bit sequence can be tamper-resistant even if the paper speckle is tampered to a small degree. To show the exemplary tamper resistant property, 100 paper speckles can be tampered by crumpling the speckled region of paper to a minor degree. FIG. 8 shows the FHD of 100 "like" speckle bits that are tampered with a mean=0.4651 and standard deviation=0.017948. The exemplary result is similar to the exemplary result shown in FIG. 5, indicating that due to minor tampering the "like" speckles are now "unlike" or different speckles. This can be suggestive of the high sensitivity of the speckles.

Exemplary Paper Speckles as a Physical One Way Hash Function (POWHF)

For example, each exemplary paper speckle can be unique and exhibits a property of a physical one way hash function (POWHF). This can be achieved in two stages, e.g.: i) where the components of the physical system are defined, and ii) the properties required of physical one way hash functions which coincide with properties of computational one way hash functions (OWHF) are listed and each property with respect to a physical system is addressed.

Exemplary Definitions:

1. Let x be defined as the speckle present in the paper, which can be the input.

2. Let F be the process of extracting speckle x from the paper using the microscope and applying a Gabor transform.

3. Let y be the output speckle image obtained after applying F to x; y=F(x).

The above exemplary definitions can correlate with the definitions of OWHF, but there are certain differences such as: i) x is claimed to be unique, unlike input messages in OWHF which are not unique; ii) F is a physical process of extracting x; it is not a computational function, as in OWHF; and iii) x is a POWHF unlike in OWHF where F is a hash function.

Based on these exemplary differences, the properties of exemplary physical one way hash functions can be defined as:

i) Exemplary Variable Input Size: F can be applied to any size of x. The exemplary input speckle image to Gabor transforms can be of any size.

ii) Exemplary Fixed Output Size: y can always be a fixed size output. Exemplary Gabor transforms can be applied on different scale sizes of the image and the basis functions of spatial frequency domain can be scaled to produce fixed size bit sequences of the speckle image.

iii) Exemplary Ease of Computation: y=F(x) can be easy to compute. Extracting a speckle image using a microscope generally takes only a small amount of time usually in the order of milliseconds. Applying exemplary Gabor transforms to the extracted speckle image takes $O(x^2)$, as convolution function can be applied at every point in the speckle image.

iv) Exemplary Pre-image Resistance: For any given y, the probability of finding or creating x with F(x)=y can be negligible. The problem of cloning the paper or the speckle x can be highly impractical.

v) Exemplary $2^{nd}$ Pre-image Resistance: It can be physically infeasible to find any two speckles $x_1$ and $x_2$ such that $F(x_1)=F(x_2)$. This infeasibility was shown to be $2^{7504}$.

vi) Exemplary High Sensitivity: Even if the speckle is physically damaged slightly, which can be equivalent to changing a single bit, the output y varies highly, similar to the avalanche effect. By tampering the exemplary paper speckle to a minor degree, which can be equivalent to changing a single bit, there was a large change in the output.

Sensitivity of Gabor Transforms

Exemplary Gabor transforms can be sensitive to changes in, e.g.: i) paper speckle due to environmental influences (like rain, dust, crumpling), which are quite common in rural areas, and ii) speckle image extraction. Such changes can change the speckle pattern. To address this problem, a tamperproof algorithm can be used to compare two speckles in the wake of adverse conditions (environmental and physical) as opposed to a tamper-resistant algorithm such as Gabor transforms.

Exemplary procedures that can be used to address high sensitivity and tamper resistance are standard object recognition local/global descriptors based on Gradient Location Orientation Histogram (GLOH, which is computed by changing the location grid and using Principal Component Analysis to reduce the dimension of the descriptors), Speed Up Robust Features (SURF, a detector-descriptor scheme that uses a Hessian matrix based detector and a Haar wavelets distribution based descriptor), and a GIST vector (a low dimensional vector representation of global features of an image that essential captures the "gist" of the scene or image, and has a 512 length feature vector that is found by calculating oriented filter features on a 4×4 grid of the image). These can identify speckle patterns in a more robust manner and can provide a tamper-proof solution.

Exemplary Evaluation

An exemplary experimentation and results obtained from implementing the above mentioned exemplary algorithms on different types of speckle images under various conditions are described herein. Four exemplary different exemplary categories of paper were considered in the analysis: (a) A4 size print paper; (b) thin notebook style paper (ruled notebooks); (c) thick print poster-style paper (used for printing posters); and (d) brown-colored binding paper.

In addition, exemplary results were tested on three different microscopes; two by Digital Blue™ and one by PC Gears™. The reason for considering different microscopes can be to ensure better validity of the results across different microscopes. Overall, close to 1200 different speckle patterns were generated for the analysis (around 700 from Digital Blue™ and the rest from PC Gears™). The analysis can be based on these different images that showed the following exemplary results:

1) Same region, same paper: When exemplary speckle images are repeatedly taken of the same region of a piece of paper with almost the same orientation (within 20°), an exemplary algorithm is able to always quickly identify a match in the order of a few seconds.

2) Different pieces of paper: Whenever exemplary speckle patterns of different pieces of paper are compared, an exemplary algorithm differentiates across the two speckle patterns, thereby giving a low matching index.

3) Time: Based on analyzing paper speckle variation over a 2 month period, it was shown that the speckle pattern shows very little variation over time. A variety of paper damaging techniques were tested (including stretching, pressing paper), which all had a very minor impact on the speckle pattern.

4) Tampering: Tampering of speckles under two extreme conditions: (i) water soaking, and (ii) crumpling, causes the matching values to slightly decrease, but still providing sufficient conditions for speckle matching, suggesting that speckles are quite tamper resistant.

Same Region, Same Paper

Figure 9:
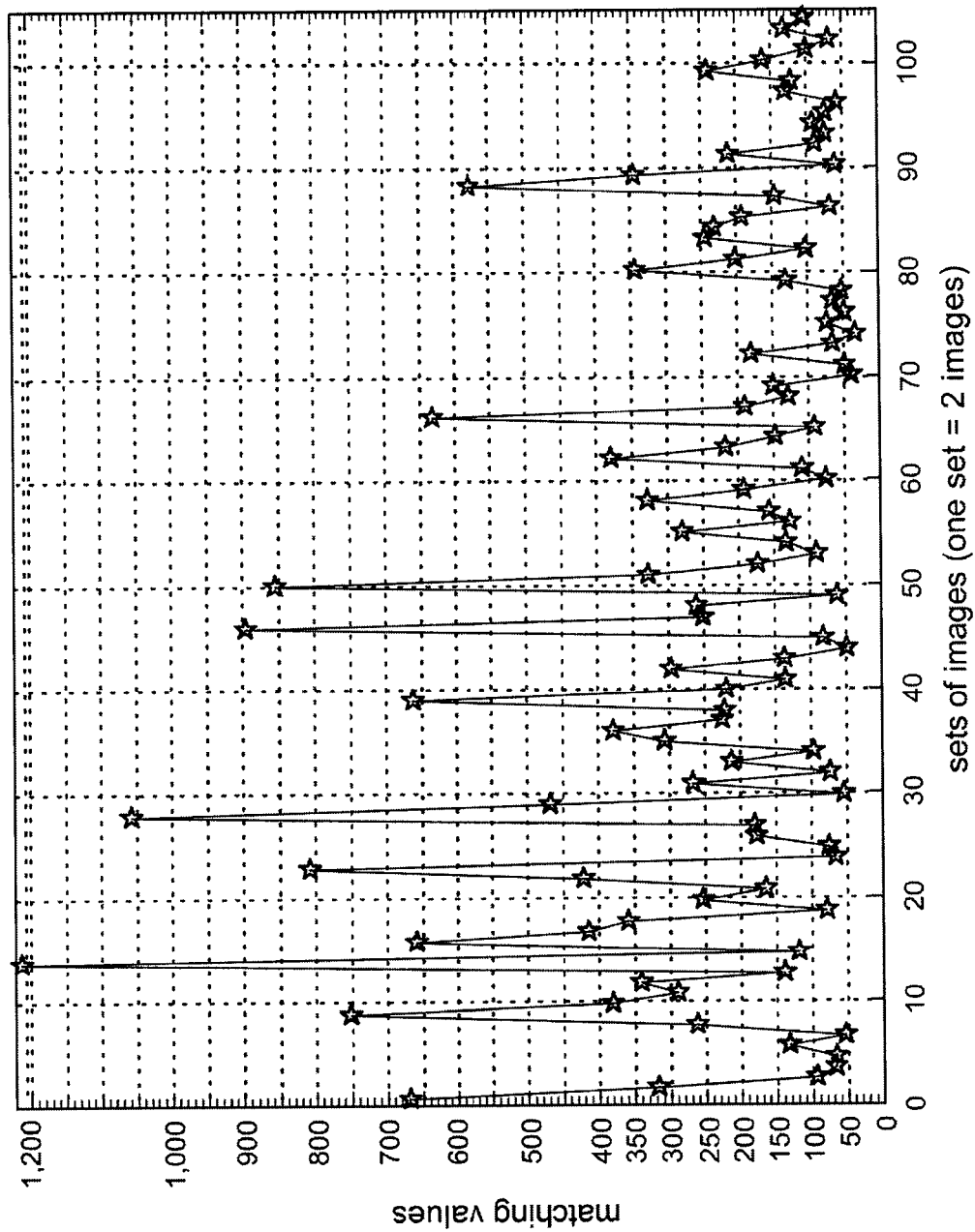
FIG. 9 is an illustration of an exemplary graph showing a performance of an exemplary algorithm comparing images.

FIG. 9 shows a graph of an exemplary performance of an algorithm, comparing 100 pairs of images (total of 200 images), comparing a pair at a time. It can be observed from the exemplary graph of FIG. 9 that an exemplary procedure gives a consistent matching for all the image pairs. Based on this exemplary analysis, a threshold of 50 was chosen for the exemplary procedure to declare a match. Speckles of different pieces of paper distinctly have a very low match index; thus, 50 can represent a good and safe cut-off to capture, e.g., all cases in the same orientation.

Different Region, Different Paper

Figure 10:
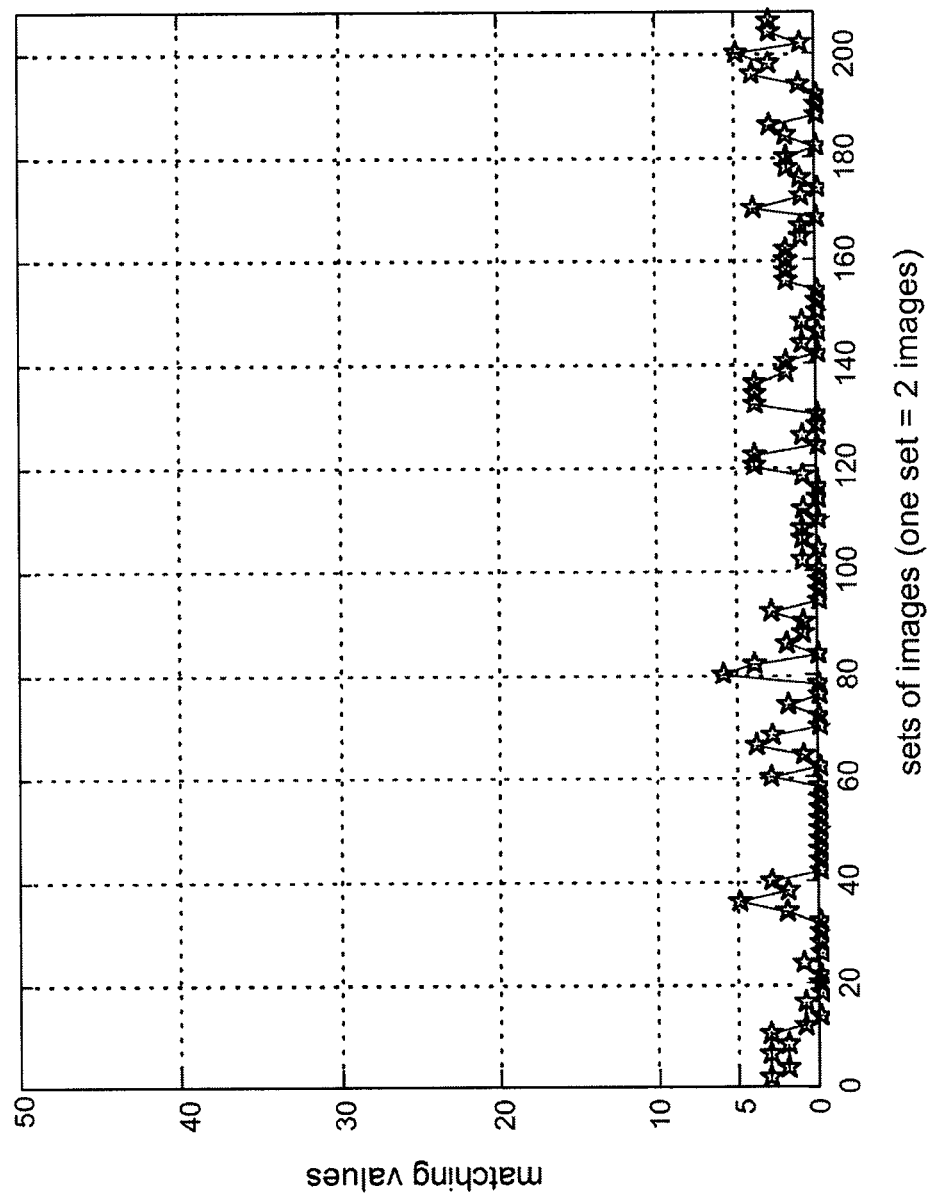
FIG. 10 is an illustration of an exemplary graph showing a comparison of different speckles with each other.

FIG. 10 illustrates a graph of an exemplary comparison of 200 pairs of speckles (total of 400 images) where each pair consists of two different speckles. The exemplary algorithm shows that images in a set are different from each other as matching values are never above 6.

Speckle Variation with Time

Two exemplary images were compared that were taken 60 days apart. There was no decrease in "ink blob" nor was there any decrease in the intensity of the "ink blob". Other environmental influences such as sunlight, dust and moisture may be a factor.

Tampering

Tampering can pose a challenge to the exemplary procedure in identifying images. Two types of exemplary tampering can be, e.g.,: i) Soaking in water; and ii) Crumpling.

Soaking in water: Papers can often get moist, or wet, due to various reasons. Identifying speckles when the paper is wet or moist can be a tough task, as light tends to reflect and refract based on the moist surfaces. Therefore, speckle regions that are moist can give a completely different speckle pattern. However, it was observed that soaking the paper in water does not spoil the exemplary speckle pattern significantly.

Figures 11A, 11B, 11C:
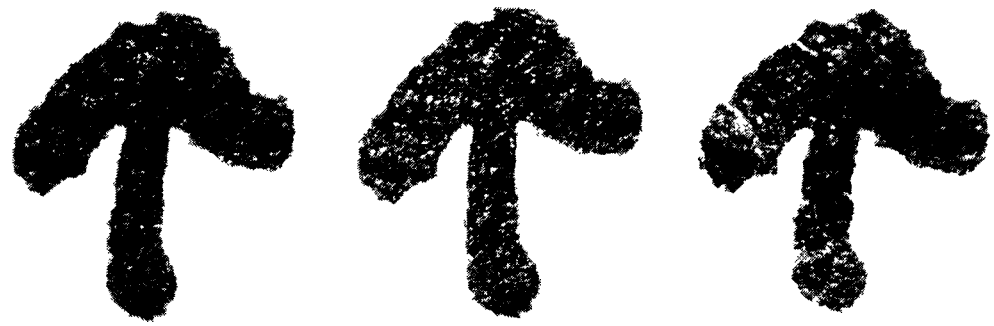
FIG. 11a is an illustration of an original image.
FIG. 11b is an illustration of a "soaked" image.
FIG. 11c is an illustration of a "crumpled" image.

FIG. 11*a* illustrates an original image, while FIG. 11*b* illustrates an image after it was soaked in water. For example, the paper was dried and then the image was extracted. The results in FIGS. 11*a* and 11*b* illustrate that the matching value between a water soaked speckle and a dry speckle is around 70, clearly indicating high commonality between the two images. Also, this is suggestive of the fact that the exemplary algorithm is quite robust to water soaking.

Crumpling: Papers can tend to crumple even when a tiny force is applied. At times, due to the aging of paper, the color changes and the paper can become delicate. If not handled properly, crumpling of paper can often be a certainty. Identifying the speckle pattern in a crumpled paper can also be a tough task, as crumpling changes the fiber structure within the paper, thereby spoiling the speckle pattern. The exemplary procedure performs appropriately when the crumpling does not spoil the ability to focus and extract a speckle pattern. If unable to focus the microscope on the speckle after crumpling, then crumpling can affect the ability to identify a watermark. To really reach such a stage, the region of the speckle has to be crumpled in such a way that it is clearly visible to the human eye that the speckle pattern is spoilt beyond recognition. So, if the crumpling is not severe, the watermark can still be extracted and authenticity can be proven. FIG. 11c illustrates an exemplary image of a crumpled speckle as compared to the original image in FIG. 11a. Certain "spurious" patterns (like cuts and straight lines) can be seen in FIG. 11c that are not present in the original speckle image of FIG. 11a.

Figure 12:
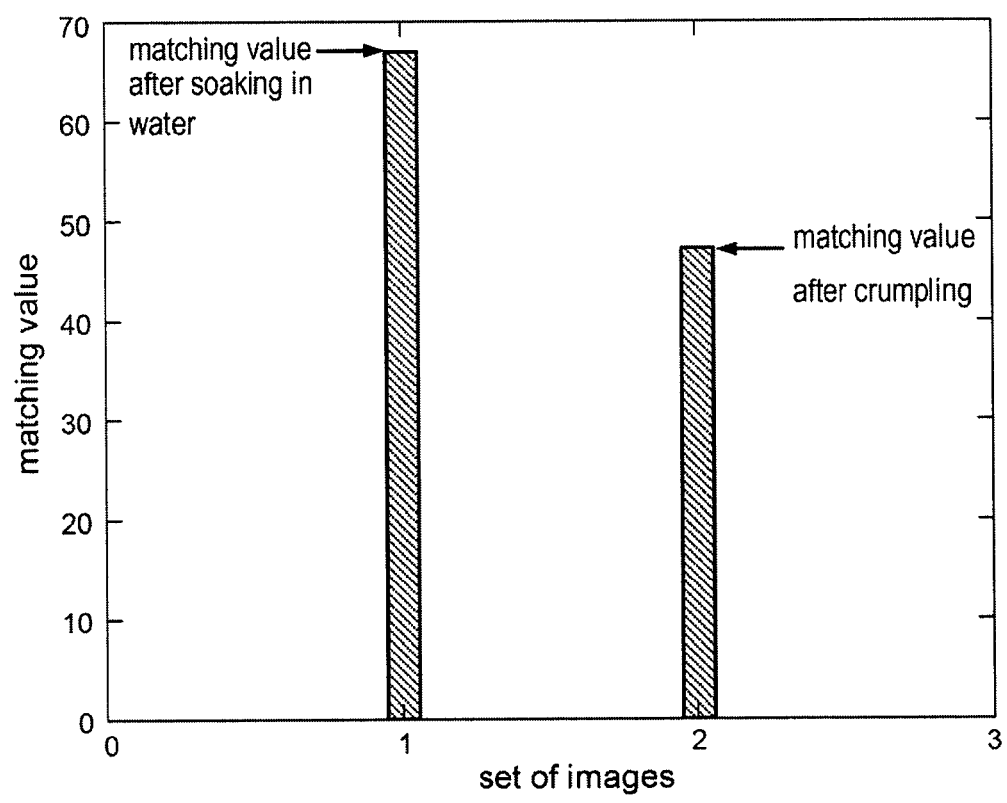
FIG. 12 is an illustration of an exemplary graph showing a matching for a water soaked image and crumpled image versus an original.

FIG. 12 illustrates an exemplary graph showing the matching for a water soaked image (1 on the x-axis) versus an original image, and a crumpled image (2 on the x-axis) versus an original image. FIG. 13 illustrates an exemplary graph providing exemplary matching values for tampered speckles. For example, each line can represent an exemplary matching value between the same specklesFusb where one of the speckles is tampered. The first 5 exemplary image pairs show matching values between an original speckle versus a water soaked speckle. The last 5 exemplary image pairs show matching values between the original speckle versus a crumpled speckle.

Exemplary Factors

Certain problems in using paper speckles can appear under various scenarios such as: i) when there is change in speckle image orientation; ii) wear & tear; and iii) manual image registration.

Exemplary Change in Orientation

In an exemplary memory effect of paper speckle, there can be a minor variation in image extraction that produces speckles that vary significantly from the original image. These orientation variations can cause problems while comparing speckles. An evaluation of these orientation problems can be performed by comparing two speckle images, one taken at 0° to the observer, another rotated by more than 20° from the observer.

Figure 15A:
FIGS. 15a and 15b are illustrations showing the same speckle images at different times.
Figure 15B:

FIG. 14 shows a graph of a performance of an exemplary procedure, comparing 100 pairs of same speckle images (total of 200 images) comparing each pair at a time. For example, as the radial orientation can be large, 36 pairs of image matching values are less than 50 where the algorithm does not report a match. A simple solution can be used to address this orientation problem. For example, instead of marking a dot in the paper, a marking with a certain orientation can be specified as part of the marking. This helps in using the structure of the shaded region to match a specific orientation placement of the microscope (as illustrated in exemplary images of FIGS. 15a and 15b. To address with a 90° orientation issue, an exemplary solution can be to extract two watermark images for the same region and compare a new image against both these images. FIGS. 15a and 15b show the same exemplary speckle images taken at different times with almost the same orientation, showing the speckle pattern is fairly similar.

Exemplary Manual Image Registration

The process of extracting speckle images from paper can require a specific focus. An exemplary microscope used should be focused on the region of speckle and the paper should be oriented in the proper fashion as much as possible to avoid orientation problems. This process may be manually performed. For a large number of speckle images this may be tedious, and a computer arrangement with a processor may be used for a large number of speckle images.

Exemplary Cloning

A cloning problem can arise with paper speckles based on photocopying paper and fabrication of paper speckle.

Photocopying Paper

Paper containing a speckle pattern can be photocopied in an attempt to fake or pass the image matching process. However, photocopying the paper has inherent drawbacks and paper speckle is designed to withstand such type of attacks. These exemplary drawbacks can include, e.g.,: i) a speckle is the unique fingerprint of a paper which is caused due to multiple scattering of light passing through the fiber structure of the paper. Photocopying such paper can provide the contour of the speckle pattern, but it will likely not provide the same speckles within the speckle pattern. Due to the half toning effects of the photocopying process, the shape of the speckle can also differ from the original shape. Since, speckle dimensions can be in the millimeter range, such as, e.g., 2 mm×2 mm, it is unlikely that even the contour can be photocopied.

Exemplary Fabrication of Paper Speckle

Another way to attempt to compromise the authenticity of speckles is to manufacture paper with the speckle pattern using a 3-D fabrication processes. Fabricating paper using photolithography techniques is an expensive process usually in the order of hundreds of millions of dollars. Also, these processes manufacture large number of identical structures and are not suited for producing just one cloned copy of the structure (paper). Paper currency can be produced using a form of microprinting and a lithography technique. But, identical copies are produced usually in large numbers. Manufacturing just one copy would be infeasible.

Exemplary Dimensionality Reduction

Gabor transforms can provide a way to identify and compare speckle images. In a case of offline paper checks, to have a robust system an important property can be needed: a way to represent the image in a compact form. This can serve two purpose. One, it can provide a method to compare images by just their low dimensional representation. This reduces computation/processing time and storage space. Second, cryptography techniques can be used on the compact representation to perform authentication (offline authentication). Various methods for dimensionality reduction can be used.

Exemplary Random Projection

In random projection, the d-dimensional data is projected onto a k-dimensional (where k<<d) subspace through the origin, using a random k×d matrix R whose columns are normalized (unit length). Let $X_{d \times N}$ be the original matrix (set of N d-dimensional observations, $$X_{k \times N} = R_{k \times d} X_{d \times N}$$

is the projection of the data onto a lower k-dimensional subspace. This uses Johnson-Lindenstrauss lemma: if points in a vector space are projected onto a randomly selected subspace of suitably high dimension, then the distances between the points are approximately preserved. Forming the random matrix R and projecting the d×N data matrix X into k dimensions is of order O(dkN), and if the data matrix X is sparse with about c nonzero entries per column, the complexity is of order O(ckN).

The Euclidean distance between two vectors x1 and x2 in the original high dimensional space can be written as $\|x_1 - x_2\|$. After the random projection, this distance is approximated by the scaled Euclidean distance of these vectors in the reduced space:

$$\sqrt{\frac{d}{k}} \|Rx_1 - Rx_2\|$$

where d is the original and k the q reduced dimensionality of the data set. The scaling term $$\sqrt{\frac{d}{k}}$$

takes into account the decrease in the dimensionality of the data: according to the Johnson-Lindenstrauss lemma, the expected norm of a projection of a unit vector onto a random subspace through the origin in $$\sqrt{\frac{d}{k}}.$$

A linear mapping such as (1) causes significant distortions in the data set if R is not orthogonal. We do not use random projection techniques because:
1. Orthogonalizing R can be computationally expensive.
2. The low dimensional vectors in random projections are significantly distorted and reconstruction is much harder than in other methods such as Principal Component Analysis (PCA).

Exemplary Principal Component Analysis

In principal component analysis (PCA), the eigenvalue decomposition of the data covariance matrix is computed as $E\{XX^T\}=E\Lambda E^T$ where the columns of matrix E are the eigenvectors of the data covariance matrix $E\{XX^T\}$ and $\Lambda$ is a diagonal matrix containing the respective eigenvalues.

The matrix X can be projected onto a subspace spanned by the most important eigenvectors, $$X^{PCA}=E_k^T X$$

where the d×k matrix $E_k$ contains the k eigenvectors corresponding to the k largest eigenvalues. PCA can be an optimal way to project data such that the squared error introduced in the projection is minimized over all projections onto a k-dimensional space. The eigenvalue decomposition of the data covariance matrix is computationally expensive. The computational complexity of estimating PCA is $O(d^2 N)+O(d^3)$. The computationally less expensive methods can be based on Singular Value Decomposition (SVD).

In SVD, X can be decomposed as, $X=USV^T$, where orthogonal matrices U and V contain left and right singular vectors of X, respectively, and the diagonal of S contains the singular values of X. Using SVD, the dimensionality of the data can be reduced by projecting the data onto the space spanned by the left singular vectors corresponding to the k largest singular values, $$X^{SVD}=U_k^T X$$

where $U_k$ is of size d×k and contains these k singular vectors.

For sparse matrices, SVD can be computed using the iterative power method, Lanczos or Jacobi method. For dense matrices, (that usually arise in computer vision applications), sampling based approximations such as Column sampling method or Nystrom approximation are used to approximate SVD.

Exemplary Compact Codes

A technique called "Spectral Hashing" can be used to produce compact binary code representation of tiny images that are semantically related to one another. The main objective was to retrieve images that are semantically related to each other in a fast manner. The algorithm used PCA and considered the first k eigenfunctions of corresponding largest eigenvalues and thresholded them to 0, to produce a compact binary code. This algorithm can be comparable to other state-of-the art in semantic hashing and provides an incentive that PCA can be used to derive compact hash codes for speckle images.

Exemplary Approach

A basic idea in can be to use a combination of Gabor transform and PCA to produce unique compact codes: a low dimensional representation of the speckle image. Speckles can be compared using the Gabor transform and tests can be performed to show statistical independence and uniqueness of the paper speckles. Here, an algorithm can be provided that uses these approaches along with PCA to produce a unique compact representation of each speckle. Some results are shown of applying this algorithm to a large data set of speckle images.

Exemplary Gabor PCA Algorithm

In an exemplary algorithm developed, a Gabor transform procedure was combined with a Principal Component Analysis (PCA) that is robust to sensitivity and provides similar results as other local/global descriptor based image processing algorithms.

Figure 16A:
FIG. 16a is an illustration of an image after undergoing an exemplary Gabor transform.
Figure 16B:

In one example, a Gabor transform is applied to a speckle image M. These are represented by the function Gabor Convolve. The speckle image is convolved through various stages until a "zebra" image is obtained, as illustrated in FIG. 16. FIG. 16*a* shows an image after undergoing a Gabor transform (a "zebra" image), and FIG. 16*b* shows the original image. PCA can be applied to the "zebra" image and the largest eigenvalues are chosen as the compact code of the speckle image. This is also a one way hash of the speckle image, as it is hard or impossible to retrieve (reconstruct) the image from these eigenvalues (compact code). In PCA, the largest eigenvalues can be required and the corresponding eigenvectors for approximate reconstruction of the image.

An algorithm for the Gabor PCA transform can be:

```
input: M = speckle image, numScale = number of wavelet scales,
  norient = number of filter orientations, minWavelength =
  wavelength of smallest scale filter, scalefac = scaling factor,
  raSD = ratio of standard deviation, raAI = ratio of angular interval
output: C = compact code (one way hash)
1 GaborPCA (M )
2 G = GaborConvolution (M, numScale, norient, minWavelength,
  scalefac, raSD, raAI);
  P = ApplyPCA (G);
  C = ChooseEig (P);
```

Exemplary Evaluation

Figure 17:
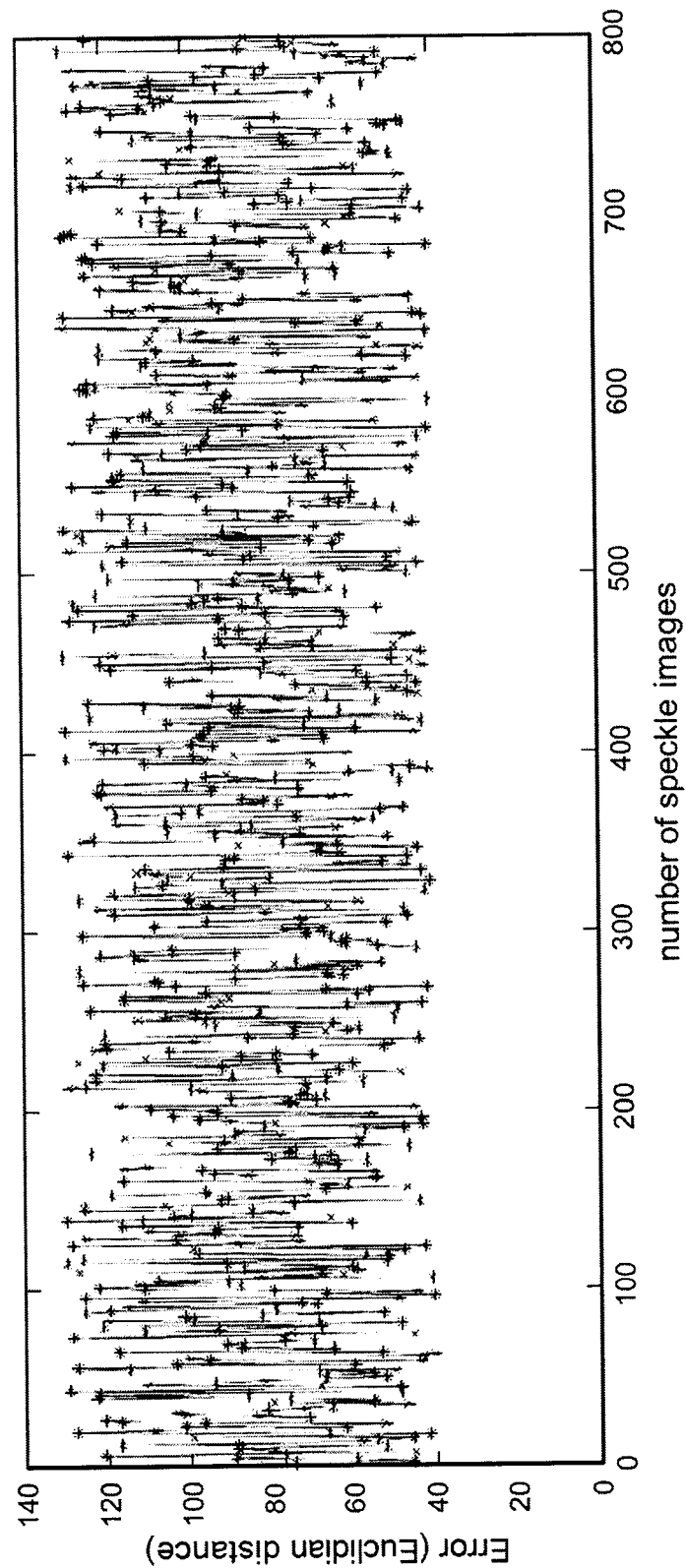
FIG. 17 is an illustration of an exemplary graph showing a compact hash code of an exemplary speckle compared with hash codes of the rest of speckle images in an exemplary dataset.

FIG. 17 shows an evaluation of the exemplary algorithm across 800 speckle images. One speckle image's hash code is compared with the hash of each of the image in the entire dataset. Let the speckle image be A. In FIG. 6, all the images provide a high error rate (difference in Euclidean distance between the hash codes), which shows that that image A is not present in the dataset. In FIG. 17, one compact hash code of a speckle is compared with hash codes of the rest of the rest of speckle images in the dataset. The error between each hash code shows that the image is not present in the dataset.

Figure 18:
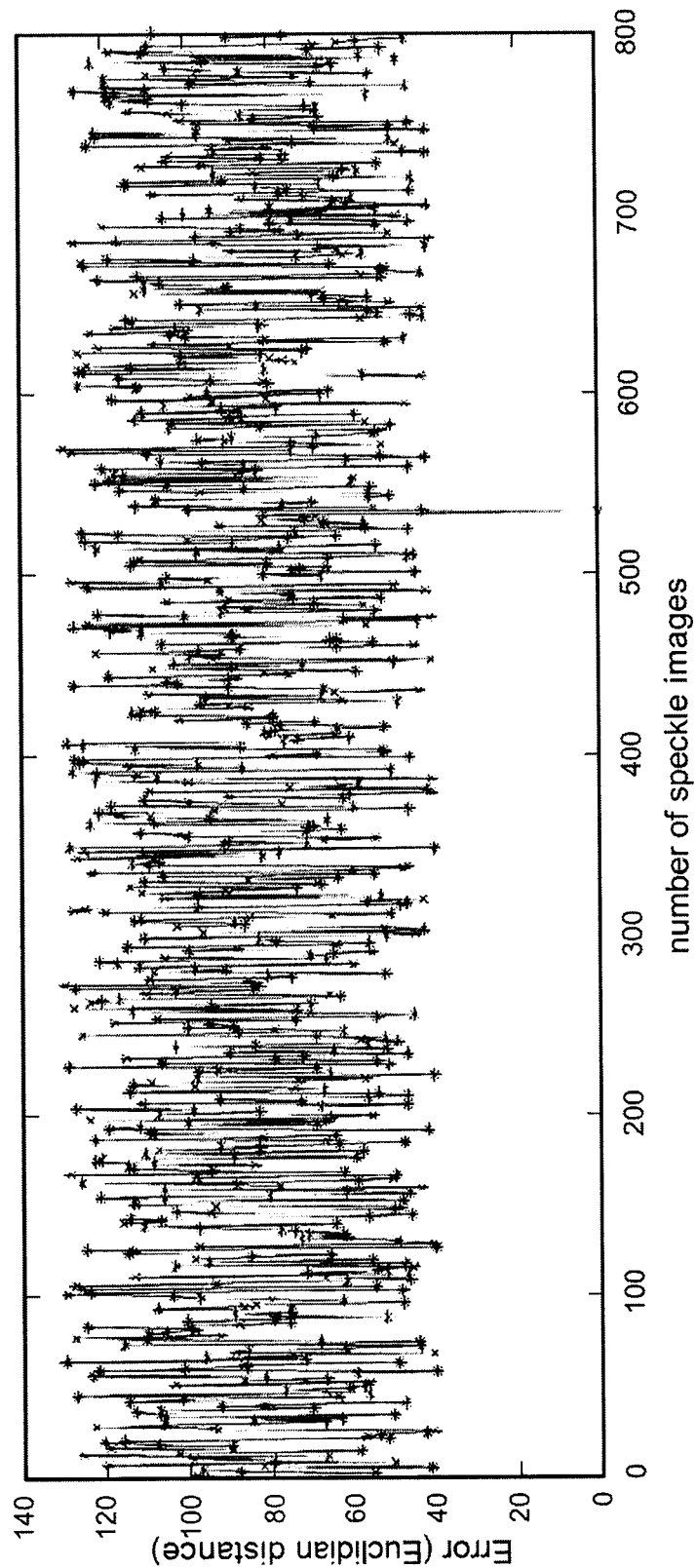
FIG. 18 is another illustration of an exemplary graph showing a compact hash code of an exemplary speckle compared with hash codes of the rest of speckle images in an exemplary dataset.

Next, image A can be included (insert image A in a random position) in the dataset and run the same experiment of comparing the hash code of image A with the rest in the dataset. In FIG. 18, it can be seen that all the codes provide a high error rate, except for one image (around 530). In FIG. 18, one compact hash code of a speckle is compared with hash codes of the rest of the rest of speckle images in the dataset. The error around image index 530 shows that one of the hash codes is a match. This shows that image A is present in the dataset.

Exemplary Offline Authentication

A first step of an exemplary offline authentication mechanism can be the paper check generation:

1. Paper check, receipt or voucher is provided by a trusted authority such as a Bank or the Microfinance Institution (MFI).

2. Bank stores a speckle image A, generates a compact hash code c corresponding to the speckle image and a random number r.

3. Bank, then computes $B=c+f_{pri}(r)$, where $f_{pri}$ is a cryptographic function used by the bank to encrypt the random number r with it's private key $b_{pri}$. The paper check contains three artifacts: a) speckle A; b) random number r; and c) number B.

4. The check can contain further artifacts such as, a) random number based on an expiry date (a barcode can be printed with such a property, b) number corresponding to person's name, age, amount to be loaned etc.

The next step in the authentication process can be to demonstrate that offline authentication is indeed possible with such a protocol. Here, a scenario can be of a loan officer visiting a village and trying to determine the authenticity of the paper check of a person (loanee):

1. The officer can use a handheld device (e.g., personal digital assistant (PDA), cellular phone, cellular phone with an integrated microscope, etc.) to examine the speckle image A'.

2. The cellular phone can generate a compact hash code c' corresponding to the speckle image A. It can use a private (master) key of the Bank $b_{pri}$ to encrypt the random number r and it generates: $B'=c'+f_{pri}(r)$.

3. After generating B', it compares B and B' for a match. If it matches, the paper check is genuine; else, it is a fake.

4. This process can be done "offline" without any need for online communication with the Bank. The cellular phone can have the secret (master) key of the Bank. The cellular phone can use a handheld low cost microscope to examine the speckle image.

5. The compact hash code c can guarantee that it is the same piece of paper and the secret function $f_{pri}(r)$ can guarantee that the paper check was given by Bank.

6. The check can contain further artifacts such as an expiration date or personal information in the form of a barcode. This barcode can be scanned using the same cellular phone and verified whether the paper check has expired or is the check for the specific person etc.

This scenario can be extended: the Bank can generate B such that, $B=c+f_{pub}(r)$, where $f_{pub}$ is the public key of the Bank. As above, the check contains the a) speckle image A; b) random number r; and c) B. To authenticate such a paper check, a person can use a cellular phone (or any handheld device) to generate $B'=c'+f_{pub}(r)$ (the public key of the Bank is available to everyone) and compares this B' with original B to authenticate and verify the check. This method can provide similar guarantees as the above scenario. One advantage can be that, any person with valid software in their cellular phone can check the authenticity of the paper check in an offline way, without any secret/master key of the Bank.

There can be other scenarios where offline verification is possible. Below is an outline describing an exemplary scenario, where the creation/verification of secure check is possible, between two parties using public key cryptography. Let $P_1$ and $P_2$ be the two transaction parties. Let $b_{s1}$ and $b_{p1}$ be the private and public keys of $P_1$; $b_{s2}$ and $b_{p2}$ be the private and public keys of $P_2$ respectively.

1. $P_1$ generates $B=c+r$, where c is the compact hash code of the speckle image A and r is a random number.

2. $P_1$ generates $f_{s1}(r)$: encrypts r using it's private key $b_{s1}$. It then generates $f_{p2}(f_{s1}(r))$: encrypts $f_{s1}(r)$ using the public key $b_{p2}$ of $P_2$.

3. On the check, $P_1$ writes B and $f_{p2}(f_{s1}(r))$. Other artifacts such as an expiration date etc., may also be included for added transactional convenience.

4. $P_2$ uses a cellular phone to verify and authenticate this check. It generates c' from speckle image A; uses it's private key $b_{s2}$ to decrypt $f_{p2}(f_{s1}(r))$ into $f_{s1}(r)$; uses $P_1$ public key $b_{p1}$ to decrypt $f_{s1}(r)$ to get r. It then generates $B'=c'+r$.

5. Finally, $P_2$ compares B' with B to verify the authenticity of the paper check.

6. Again, here c ensures that it is the same piece of paper and not a duplicate and the public key handshaking protocol ensures that the check was given by $P_1$.

7. This is a standard public key cryptography protocol and needs no centralized authority or any keys from a centralized authority for verification. This represents a decentralized approach towards offline verification of a paper check between any two parties. The approach can be generalized to a much broader category of scenarios.

Exemplary Embodiments

Figure 19:
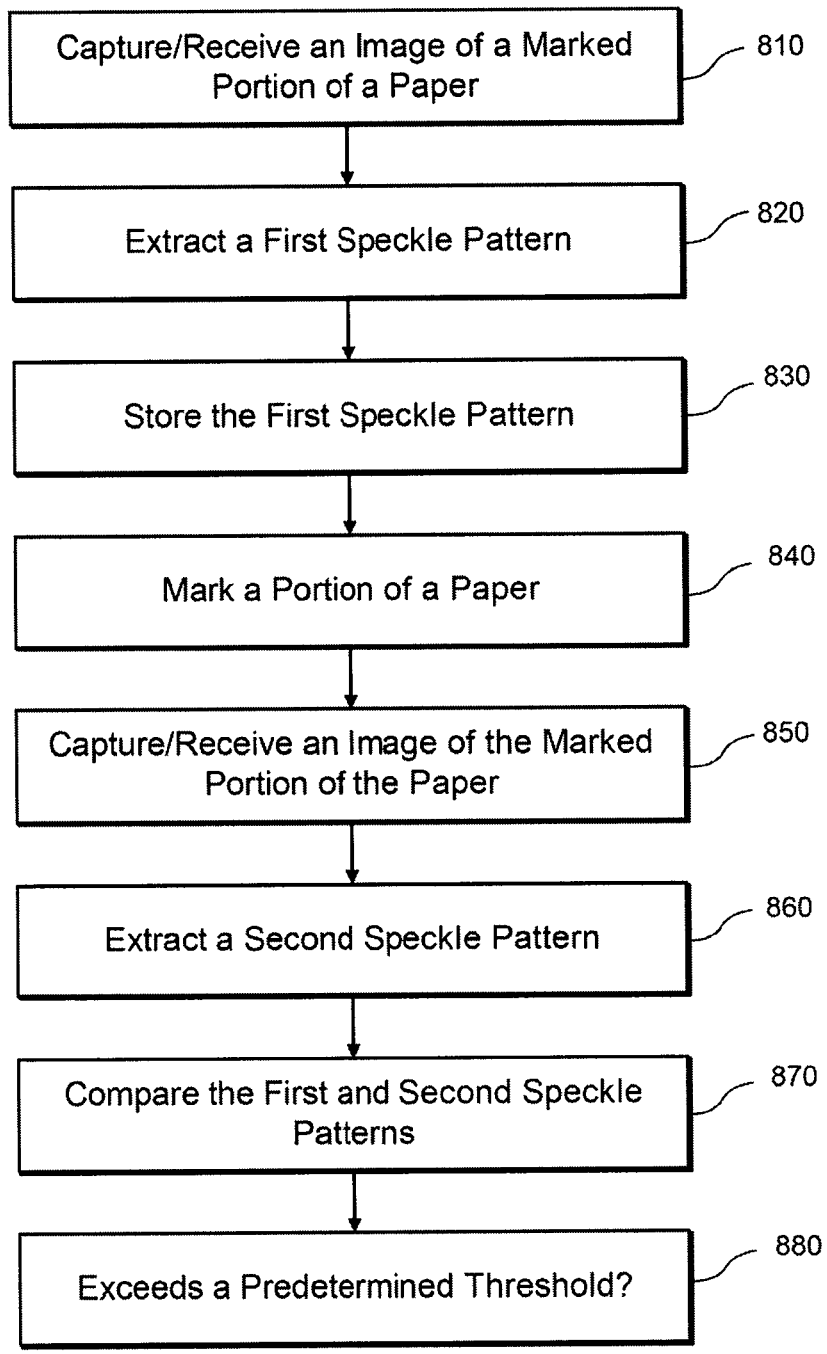
FIG. 19 illustrates a flow diagram according to an exemplary embodiment of a method of the present disclosure.

FIG. 19 illustrates a flow diagram according to an exemplary method for authenticating a non-digital medium, such as a paper or a portion of a paper. Initially, e.g., at 810, an image is captured/received of the non-digital medium, such as a marked portion of a paper. The paper can have an irregular surface. Once this image is received, a first speckle pattern is extracted at 820. The first speckle pattern can be stored at 830.

At a later time, for verifying an authentication of the document, a portion of a paper that needs to be authenticated can be marked at 840 by a marking device, such as a marker, a pen, an ink-containing device or a paper printing device. An image can be received for the marked portion of the paper document at 850. This image can be captured by a microscope, such as a USB microscope or any other microscope. The microscope can be a handheld device, such a cellular telephone integrated with a microscope, or a digital camera integrated with a microscope. A second speckle pattern of the marked portion can then be extracted at 860. Then, the first speckle pattern and the second speckle pattern can be compared at 870. The speckle patterns can comprise a unique watermark. The comparison can be performed by using a computer arrangement, using a predetermined procedure, such as a combination of a Gabor transform and a Principal Component Analysis procedure. The computer arrangement can convert the first speckle pattern into first data and the second speckle pattern into second data using a Gabor transform procedure. The first data can be compared to the second data using a fractional hamming distance to determine a similarity at 870.

If a similarity between the first and second speckle patterns equals or exceeds a predetermined amount, then the paper or non-digital medium of the document can be determined to be authentic at 880. If not, it can be verified that the document is not authentic.

FIG. 20 illustrates a block diagram of an exemplary embodiment of a system according to the present disclosure. The system can be offline. The system can comprise a disconnected authentication that uses pre-determined data stored in a memory of the device. The disconnected authentication can detect an expiration date of the paper, and can be independent of any centralized authentication system. In the system, a computer 100 can be provided having a processor 130 which can be configured or programmed to perform the exemplary steps and/or procedures of the exemplary embodiments of the techniques described above. For example, a non-digital medium of a document 110 can be positioned so that an image capturing device 120 is able to capture an image of a marked portion of the non-digital medium 110. The non-digital medium 110 can be a paper that need to have its authenticity verified. The image capturing device can be a microscope, such as a USB microscope, or a cellular phone integrated with a microscope, and be connected to the computer 100 through a standard USB port. The image capturing device can also be a digital camera, which can be integrated with a microscope. The image of the non-digital medium 110 can be provided by the image capturing device 120 to the computer 100 as data, which can be transmitted to the processor 130 and/or storage arrangement 140.

According to one exemplary embodiment of the present disclosure, the data can be stored in a storage arrangement 140 (e.g., hard drive, memory device, such as RAM, ROM, memory stick, floppy drive, etc.). The storage arrangement 140 can have in it stored various speckle patterns to verify authenticity of various non-digital mediums for non-documents. The processor 130 can access the storage arrangement 140 to execute a computer program or a set of instructions (stored on or in the storage arrangement 630) which perform the procedures according to the exemplary embodiments of the present disclosure.

Thus, e.g., when the processor 130 performs such instructions and/or computer program, the processor 130 can be configured or programmed to perform the exemplary embodiments of the procedures according to the present disclosure, as described above herein. For example, the processor 130 can receive the image from the image capturing device 120 and/or the storage arrangement 140. It can extract a first speckle pattern from the image. This speckle pattern can be compared to a second speckle pattern stored in the storage arrangement 140 relating to the non-digital medium to determine if a similarity between the first and second speckle patterns equals or exceeds a predetermined amount. Depending on whether this predetermined threshold is exceeded or not, the processor can determine whether the non-digital medium 110 of the document is authentic or not.

A display 150 can also be provided for the exemplary system of FIG. 10. The storage arrangement 140 and the display 150 can be provided within the computer 100 or external from the computer 100. The information received by the processor 130 and the information determined by the processor 130, as well as the information stored on the storage arrangement 140 can be displayed on the display 150 in a user-readable format. For example, the display 150 can display whether the non-digital medium of the document 110 is authentic or not.

Various uses can be foreseen for paper speckle technology. The method of paper speckles can be simple, i.e., using a pen to draw an arbitrary small shaded contour and extract the speckle pattern within the shaded region. Inbuilt in this watermark is a combination of fiber fingerprints and paper signatures. The arbitrary contour is by itself a signature (since replicating a contour at a microscopic level is hard) and is immensely important to translate and orient the final image. The contour and the random speckle pattern represents the watermark of the paper. The speckle pattern can be fairly constant across different lighting scenarios. While not every speckle may appear in every image, the fact that a sizable majority appear across each image is sufficient for authentication purposes.

Paper speckle technology can have uses for hospitals, educational and financial institutions, microfinance, healthcare, immigration, land ownership records, supply chain management systems, education, drug tracking, inventory management, offline checks and documents, to name a few. Paper speckle technology can be used to authenticate an item, such as any physical object that is or comprises a paper. Paper speckle technology can also be used for tracking an item having a paper, where an image can be obtained of a marked portion in the paper, and a speckle pattern can be extracted. This extracted speckle pattern can be stored to mark an identity of the paper. This information can be transmitted by a communication interface in the device used to obtain the image and/or other processing device. A remote device receiving this information can have predetermined data to determine the identity of the paper and can verify the authenticity of the paper, and can transmit this information back to the transmitting device.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements, and methods which, although not explicitly shown or described herein, embody the principles of the invention and are thus within the spirit and scope of the invention. In addition, all publications and references referred to above are incorporated herein by reference in their entireties. It should be understood that the exemplary procedures described herein can be stored on any computer accessible medium, including a hard drive, RAM, ROM, removable discs, CD-ROM, memory sticks, etc., and executed by a processing arrangement which can be a microprocessor, mini, macro, mainframe, etc.

What is claimed is:

1. A method for authenticating a portion of a non-digital medium for a document, comprising:
receiving at least one image of at least one first marked portion of the non-digital medium for the document, wherein the at least one image is based on a radiation generated by at least one of an ambient light source or a partially coherent light source;
extracting at least one first speckle pattern of the at least one first marked portion; and
using a computer arrangement, comparing the first speckle pattern of the at least one first marked portion with at least one second speckle pattern relating to the non-digital medium to determine if a similarity measure based on at least one of local descriptors or global descriptors of the first and second speckle patterns is at least one of equal to a predetermined amount or within a predetermined range,
wherein the at least one first speckle pattern is based on the radiation, and wherein the at least one second speckle pattern is based on at least one of (i) the radiation or (ii) a further radiation generated by at least one of a further ambient light source or a further partially coherent light source.

2. The method of claim 1, wherein the computer arrangement compares the first speckle pattern data with the second speckle pattern using a predetermined procedure.

3. The method of claim 2, wherein the predetermined procedure comprises (i) an object recognition procedure identifying the at least one of the local descriptors or global descriptors in the at least one speckle pattern, and (ii) a mathematical transformation procedure generating a low dimensional representation of the at least one speckle pattern.

4. The method of claim 2, wherein the predetermined procedure comprises a combination of (i) a Gabor transform for generating at least one of the local or global descriptors, and (ii) a Principal Component Analysis for generating the low dimensional representation of the at least one speckle pattern.

5. The method of claim 1, further comprising:
with the computer arrangement, converting the at least one first speckle pattern into first data and the at least one second speckle pattern into second data using a Gabor transform procedure; and
comparing the first data and the second data using a fractional hamming distance to determine the similarity.

6. The method of claim 1, further comprising:
with the computer arrangement, converting the at least one first speckle pattern into first data and the at least one second speckle pattern into second data using a Gabor transform procedure;
with a Principal Component Analysis procedure, generating a low dimensional representation from each of the first data and the second data; and
determining a further similarity measure between the at least one first speckle pattern and the at least one second speckle pattern by determining whether a particular distance between a first low dimensional representation and a second low dimensional representation is within a predetermined range, wherein the predetermined range is determined using a predetermined procedure.

7. The method of claim 1, wherein the at least one first speckle pattern comprises a random intensity pattern produced by a combination of (i) an exposure of the non-digital medium to at least one of the ambient light or the partially coherent light, and (ii) an interference of multiple scattered wavefronts that are subject to at least one of phase differences or intensity fluctuations associated with the at least one of the ambient light or the partially coherent light.

8. The method of claim 1, wherein the at least one first marked portion is marked by a marking device.

9. The method of claim 1, further comprising:
exposing the first marked portion to at least one of the ambient light or the partially coherent light; and
obtaining a scattered speckle pattern associated with the at least one first marked portion, wherein the at least one second speckle pattern is based on the scattered speckle pattern.

10. The method of claim 1, wherein the at least one image of the at least one first marked portion is received using a microscope arrangement.

11. The method of claim 10, wherein the microscope arrangement is at least one of a Universal Serial Bus microscope, a digital camera integrated with a microscope or a cellular telephone integrated with a microscope.

12. The method of claim 1, wherein the non-digital medium includes paper, and wherein the at least one image is received from the paper which is at least one of crumpled or wrinkled in a proximity of the at least one first marked portion of the paper.

13. The method of claim 1, wherein at least a portion of the non-digital medium has contact with a liquid in a proximity of the at least one first marked portion, and wherein the at least one image is received from the portion of the non-digital medium which came in contact with a liquid.

14. The method of claim 1, wherein the non-digital medium comprises an aged paper document.

15. The method of claim 1, further comprising:
generating a first low dimensional representation of the at least one speckle pattern based on the at least one of the local descriptors or the global descriptors, wherein the first low dimensional representation is at least one of printed, written, embedded or imprinted on the non-digital medium; and
authenticating the non-digital medium by (i) generating a second low dimensional representation of the at least one speckle pattern from the at least one of the local descriptors and the global descriptors, (ii) comparing a similarity between the second low dimensional representation and the first low dimensional representation, and (iii) determining whether the similarity measure is within the predetermined range.

16. The method of claim 15, further comprising:
encrypting the first low dimensional representation using at least one of a secret key, private key or a public cryptographic key of an authentic source, wherein the authentication procedure of the non-digital medium further comprises generating the first low dimensional representation from the at least one of the local descriptors or the global descriptors of the at least one speckle pattern;
using the at least one of the secret key, the private key or the public cryptographic key of the authentic source, decrypting the encrypted first low dimensional representation; and
determining whether a further similarity measure between the second generated low dimensional representation and the decrypted first low dimensional representation is within the predetermined range.

17. The method of claim 15, further comprising:
generating a one-way hash from contents of the non-digital medium;
encrypting the one way hash using at least one of a secret key, a private key or a public cryptographic key of an authentic source, wherein the information associated with the encryption is at least one of printed, written, embedded or imprinted on the non-digital medium;
authenticating the contents of the non-digital medium by generating the one-way hash from the contents of the non-digital medium, using the at least one of the secret key, the private key or the public cryptographic key of the authentic source to decrypt the encrypted information which is printed, written, embedded or imprinted on the non-digital medium; and
determining whether there is a further similarity measure between the generated one-way hash and the decrypted one-way hash that is within the predetermined range.

18. The method of claim 15, further comprising:
generating a hash key, wherein the hash key comprises a combination of (i) at least one of a printed, written, embedded or imprinted first low dimensional representation, and
(ii) first contents of the non-digital medium computed using a predetermined procedure and encrypted using a secret key or a private key that can be at least one of printed, written, embedded or imprinted on the non-digital medium;
authenticating the non-digital medium by (i) decrypting the imprinted encrypted hash key using the private key or the public key of the authentic source, (ii) using the predetermined procedure, generating a low dimensional representation and second contents from the decrypted hash key, and (iii) determining whether a further similarity measure is between (a) the generated low dimensional representation and second contents, and (b) the imprinted first low dimensional representation and first contents, is within the predetermined range.

19. A system for authenticating a portion of a non-digital medium for a document, comprising:
a receiving arrangement configured to receive at least one image of at least one first marked portion of the non-digital medium for the document, wherein the at least one image is based on a radiation generated by at least one of an ambient light source or a partially coherent light source; and
a computing arrangement configured to extract at least one first speckle pattern of the at least one first marked portion of the non-digital medium, and compare the at least one first speckle pattern with at least one second speckle pattern relating to the non-digital medium to determine if a similarity measure based on at least one of local descriptors or global descriptors of the first and second speckle patterns is at least one of equal or within a predetermined range, wherein the at least one first speckle pattern is based on the radiation, and wherein the at least one second speckle pattern is based on at least one of (i) the radiation or (ii) a further radiation generated by at least one of a further ambient light source or a further partially coherent light source.

20. The system of claim 19, wherein the computing arrangement is further configured to compare the first speckle pattern data with the second speckle pattern using a predetermined procedure.

21. The system of claim 20, wherein the predetermined procedure comprises (i) use of an object recognition procedure to identify the at least one of the local descriptors or the global descriptors in the at least one speckle pattern, and (ii) use of a mathematical transformation procedure to generate a low dimensional representation of the at least one speckle pattern.

22. The system of claim 20, wherein the predetermined procedure comprises a combination of (i) a Gabor transform for generating at least one of the local or global descriptors, and (ii) a Principal Component Analysis for generating the low dimensional representation of the at least one speckle pattern.

23. The system of claim 19, wherein the computer arrangement is further configured to convert the at least one first speckle pattern into first data and the at least one second speckle pattern into second data using a Gabor transform procedure, and compare the first data and the second data using a fractional hamming distance to determine the similarity.

24. The system of claim 19, wherein the computer arrangement is further configured to:
convert the at least one first speckle pattern into first data and the at least one second speckle pattern into second data using a Gabor transform procedure;
with a Principal Component Analysis procedure, generate a low dimensional representation from each of the first data and the second data; and
determine a further similarity measure between the at least one first speckle pattern and the at least one second speckle pattern by determining whether a particular distance between a first low dimensional representation and a second low dimensional representation is within a predetermined range, wherein the predetermined range is determined using a predetermined procedure.

25. The system of claim 19, wherein the at least one first speckle pattern comprises a random intensity pattern produced by a combination of (i) an exposure of the non-digital medium to at least one of the ambient light or the partially coherent light, and (ii) an interference of multiple scattered wavefronts that are subject to at least one of phase differences or intensity fluctuations associated with the at least one of the ambient light or the partially coherent light.

26. The system of claim 19, wherein the first marked portion is exposed to at least one of the ambient light or the partially coherent light to obtain a scattered speckle pattern of the at least one first marked portion, and wherein the at least one second speckle pattern is based on the scattered speckle pattern.

27. The system of claim 19, further comprising a microscope arrangement, wherein the receiving arrangement is further configured to receive the image from the microscope arrangement.

28. The system of claim 19, wherein the non-digital medium comprises paper, wherein the paper is at least one of crumpled or wrinkled in a proximity of the at least one first marked portion of the paper, and wherein the at least one image is received from the paper.

29. The system of claim 19, wherein at least a portion of the non-digital medium has contact with a liquid in a proximity of the at least one first marked portion, and wherein the at least one image is obtained from the portion of the non-digital medium which came in contact with a liquid.

30. The system of claim 19, wherein the non-digital medium comprises an aged paper document.

31. The system of claim 19, wherein the computing arrangement is further configured to:
generate a first low dimensional representation of the at least one speckle pattern based on the at least one of the local descriptors or the global descriptors, wherein the first low dimensional representation is at least one of printed, written, embedded or imprinted on the non-digital medium; and
authenticate the non-digital medium by (i) generating a second low dimensional representation of the at least one speckle pattern from the at least one of the local descriptors and the global descriptors, (ii) comparing a similarity between the second low dimensional representation and the first low dimensional representation, and (iii) determining whether the similarity measure is within the predetermined range.

32. The system of claim 31, wherein the computing arrangement is further configured to:
encrypt the first low dimensional representation using at least one of a secret key, a private key or a public cryptographic key of an authentic source, wherein the authentication procedure of the non-digital medium further comprises generating the first low dimensional representation from the at least one of the local descriptors and the global descriptors of the at least one speckle pattern;
using the at least one of the secret key, private key or public cryptographic key of the authentic source, decrypt the encrypted first low dimensional representation; and
determine whether a further similarity measure between the second generated low dimensional representation and the decrypted first low dimensional representation is within the predetermined range.

33. The system of claim 31, wherein the computing arrangement is further configured to:
  generate a one-way hash from contents of the non-digital medium,
  encrypt the one way hash using at least one of a secret key, a private key or a public cryptographic key of an authentic source, wherein the information associated with the encryption is at least one of printed, written, embedded or imprinted on the non-digital medium,
  authenticate the contents of the non-digital medium by generating the one-way hash from the contents of the non-digital medium, using the at least one of the secret key, the private key or the public cryptographic key of the authentic source to decrypt the encrypted information which is printed, written, embedded or imprinted on the non-digital medium, and
  determine whether there is a further similarity measure between the generated one-way hash and the decrypted one-way hash that is within the predetermined range.

34. The system of claim 31, wherein the computing arrangement is further configured to:
  generate a hash key, wherein the hash key comprises a combination of (i) at least one of a printed, written, embedded or imprinted first low dimensional representation, and (ii) first contents of the non-digital medium computed using a predetermined procedure and encrypted using a secret key or a private key that can be at least one of printed, written, embedded or imprinted on the non-digital medium,
  authenticate the non-digital medium by (i) decrypting the imprinted encrypted hash key using the private key or the public key of the authentic source, (ii) using the predetermined procedure, generating a low dimensional representation and second contents from the decrypted hash key, and (iii) determining whether a further similarity measure is between (a) the generated low dimensional representation and second contents, and (b) the imprinted first low dimensional representation and first contents, is within the predetermined range.

35. A system for authenticating at least one portion of a non-digital medium for a document, comprising:
  an imaging device configured to obtain an image of at least one first marked portion of the non-digital medium for the document, wherein the at least one image is based on a radiation generated by at least one of an ambient light source or a partially coherent light source; and
  a processing device with a processor configured to extract at least one first speckle pattern of the at least one first marked portion of the non-digital medium, and compare the at least one first speckle pattern with at least one second speckle pattern relating to the non-digital medium to determine if a similarity measure based on at least one of local descriptors or global descriptors of the first and second speckle patterns is at least one of equal or within a predetermined range,
  wherein the at least one first speckle pattern is based on the radiation, and wherein the at least one second speckle pattern is based on at least one of (i) the radiation or (ii) a further radiation generated by at least one of a further ambient light source or a further partially coherent light source.

36. The system according to claim 35, wherein the processing device comprises a handheld device that can be at least one of a cellular phone, a cellular phone integrated with a microscope, a digital camera integrated with a microscope, a smart phone, a personal digital assistant, or a notebook computer.

37. The system according to claim 35, wherein the processing device is further configured to imprint a random number derived from a predetermined procedure in the at least one first marked portion of the non-digital medium for the document, and generate a hash key using the predetermined procedure to combine a low dimensional representation generated from at least one of the local descriptors or the global descriptors of the at least one speckle pattern with the random number.

38. The system according to claim 37, wherein the processing device is further configured to authenticate the at least one first marked portion of the non-digital medium for the document by generating the hash key, deriving a low dimensional representation from the at least one speckle pattern, using the predetermined procedure to combine the low dimensional representation and the imprinted random number, and determining whether there is a further similarity measure between the generated hash key and the imprinted hash key that is within a predetermined range.

39. The system according to claim 37, wherein the processing device is further configured to encrypt the hash key using a secret key or a private cryptographic key of an authentic source stored in the processing device, and decrypt the hash key using the secret key or the private cryptographic key of the authentic source.

40. The system according to claim 25, wherein the at least one first marked portion of the non-digital medium for the document includes an expiration date stored therein.

41. The system according to claim 40, wherein the processing device is further configured to detect the expiration date.

42. A system for determining an authenticity of a paper document which includes a paper comprising a speckle pattern in a marked portion in the paper, the system comprising:
  a first device configured to obtain an image, that is based on at least one of an ambient or a partially coherent light source, of at least the marked portion in the paper; and
  a processing second device configured to extract the speckle pattern, based on at least one of an ambient or a partially coherent light source, of the marked portion in the paper.

43. The system according to claim 42, wherein the paper further comprises unique identity information about the paper.

44. The system according to claim 43, wherein the unique identity information comprises at least one of (i) a random number derived from a predetermined procedure, (ii) a low dimensional representation from at least one of local descriptors or global descriptors of the at least one speckle pattern, or (iii) a one way hash derived from the low dimensional representation imprinted in the paper.

45. The system according to claim 43, wherein the processing device is further configured to authenticate the paper by at least one of (i) deriving the random number from a predetermined procedure, (ii) deriving a low dimensional representation from at least one of local descriptors or global descriptors of the at least one speckle pattern or (lip deriving the one way hash from the low dimensional representation.

46. The system according to claim 43, wherein the unique identity information is encrypted using a secret key or a private cryptographic key of an authentic source, and wherein the paper is confirmed as authentic by decrypting the encrypted unique identity information based on a further private key or a further public cryptographic key utilized by the processing device.

47. The system according to claim 42, wherein the system further comprises a disconnected authentication configuration which is configured to use predetermined data stored in a memory of the device in an authentication procedure.

48. The system according to claim 47, wherein the disconnected authentication configuration is further configured to detect an expiration date of the paper.

49. The system according to claim 47, wherein the disconnected authentication configuration is further configured to perform an offline authentication which is independent of a centralized authentication system.

50. The system according to claim 42, further comprising a remote processor configured to authenticate the paper by comparing features from the paper and the speckle pattern from the marked portion of the paper with predetermined data corresponding to the paper to determine an authenticity of the paper.

51. The system according to claim 42, wherein the paper is further configured to be at least one of remotely authenticated or tracked, and to be incorporated with another physical object.

52. The system according to claim 51, wherein the processing device is further configured to remotely track the paper by storing the identity and the speckle pattern from the paper as the paper traverses different physical locations.

53. The system according to claim 42, wherein the processing device is further configured to compress data associated with the paper using a predetermined procedure before a communication interface transmits the data to a remote device.

54. The system according to claim 53, wherein the data comprises of low dimensional representation of at least one of local descriptors or global descriptors of the speckle pattern of the marked portion of the paper.

55. A non-transitory computer-accessible medium having stored thereon computer executable instructions for authenticating at least one portion of a non-digital medium for a document, which, when the executable instructions are executed by a processing arrangement, configure the processing arrangement to:
    obtain an image, that is based on at least one of an ambient or a partially coherent light source, of at least one first marked portion of the non-digital medium for the document;
    extract at least one first speckle pattern, based on at least one of at least an ambient or a partially coherent light source, of the at least one first marked portion of the non-digital medium; and
    compare the at least one first speckle pattern with at least one second speckle pattern, based on at least one of the ambient or the partially coherent light source or a further ambient or a partially coherent light source, relating to the non-digital medium to determine if a similarity measure based on at least one of local descriptors or global descriptors of the first and second speckle patterns is at least one of equal or within a predetermined range.

56. A non-transitory computer-accessible medium having stored thereon computer executable instructions for determining an authenticity of a paper, which, when the executable instructions are executed by a processing arrangement, configure the processing arrangement to:
    obtain an image of a marked portion of the paper, wherein the image is based on a radiation generated by at least one of an ambient light source or a partially coherent light source;
    extract a speckle pattern in the marked portion of the paper, wherein the speckle pattern is based on the radiation; and
    record and store the speckle pattern to verify an authenticity of the paper.

57. The computer-accessible medium of claim 56, wherein the processing arrangement is further configured to compare the speckle pattern with predetermined data to determine if a further similarity measure between the speckle pattern and predetermined data exists to determine the authenticity of the paper.

58. A method for authenticating a portion of a non-digital medium for a document, comprising:
    receiving at least one image of at least one first marked portion of the non-digital medium for the document;
    extracting at least one first speckle pattern of the at least one first marked portion; and
    using a computer arrangement, comparing the first speckle pattern of the at least one first marked portion with at least one second speckle pattern relating to the non-digital medium using a predetermined procedure to determine if a similarity measure based on at least one of local descriptors or global descriptors of the first and second speckle patterns is at least one of equal to a predetermined amount or within a predetermined range;
    wherein the predetermined procedure comprises a combination of (i) a Gabor transform for generating at least one of the local or global descriptors, and (ii) a Principal Component Analysis for generating the low dimensional representation of the at least one speckle pattern.

59. A method for authenticating a portion of a non-digital medium for a document, comprising:
    receiving at least one image of at least one first marked portion of the non-digital medium for the document;
    extracting at least one first speckle pattern of the at least one first marked portion;
    using a computer arrangement, comparing the first speckle pattern of the at least one first marked portion with at least one second speckle pattern relating to the non-digital medium using a predetermined procedure to determine if a similarity measure based on at least one of local descriptors or global descriptors of the first and second speckle patterns is at least one of equal to a predetermined amount or within a predetermined range; and
    using the computer arrangement, converting the at least one first speckle pattern into first data and the at least one second speckle pattern into second data using a Gabor transform procedure and comparing the first data and the second data using a fractional hamming distance to determine the similarity.

60. A method for authenticating a portion of a non-digital medium for a document, comprising:
    receiving at least one image of at least one first marked portion of the non-digital medium for the document;
    extracting at least one first speckle pattern of the at least one first marked portion; and
    using a computer arrangement comparing the first speckle pattern of the at least one first marked portion with at least one second speckle pattern relating to the non-digital medium using a predetermined procedure to determine if a similarity measure based on at least one of local descriptors or global descriptors of the first and second speckle patterns is at least one of equal to a predetermined amount or within a predetermined range;
    using the computer arrangement converting the at least one first speckle pattern into first data and the at least one second speckle pattern into second data using a Gabor transform procedure;

with a Principal Component Analysis procedure, generating a low dimensional representation from each of the first data and the second data; and determining a further similarity measure between the at least one first speckle pattern and the at least one second speckle pattern by determining whether a particular distance between a first low dimensional representation and a second low dimensional representation is within a predetermined range, wherein the predetermined range is determined using a predetermined procedure.

61. A system for authenticating a portion of a non-digital medium for a document, comprising:

a receiving arrangement configured to receive at least one image of at least one first marked portion of the non-digital medium for the document; and a computing arrangement configured to extract at least one first speckle pattern of the at least one first marked portion of the non-digital medium, and compare using a predetermined procedure the at least one first speckle pattern with at least one second speckle pattern relating to the non-digital medium to determine if a similarity measure based on at least one of local descriptors or global descriptors of the first and second speckle patterns is at least one of equal or within a predetermined range;

wherein the predetermined procedure comprises a combination of (i) a Gabor transform for generating at least one of the local or global descriptors, and (ii) a Principal Component Analysis for generating the low dimensional representation of the at least one speckle pattern.

62. A system for authenticating a portion of a non-digital medium for a document, comprising:

a receiving arrangement configured to receive at least one image of at least one first marked portion of the non-digital medium for the document; and a computing arrangement configured to:

extract at least one first speckle pattern of the at least one first marked portion of the non-digital medium;

compare the at least one first speckle pattern with at least one second speckle pattern relating to the non-digital medium to determine if a similarity measure based on at least one of local descriptors or global descriptors of the first and second speckle patterns is at least one of equal or within a predetermined range; and convert the at least one first speckle pattern into first data and the at least one second speckle pattern into second data using a Gabor transform procedure, and compare the first data and the second data using a fractional hamming distance to determine the similarity.

63. A system for authenticating a portion of a non-digital medium for a document, comprising:

a receiving arrangement configured to receive at least one image of at least one first marked portion of the non-digital medium for the document; and a computing arrangement configured to:

extract at least one first speckle pattern of the at least one first marked portion of the non-digital medium;

compare the at least one first speckle pattern with at least one second speckle pattern relating to the non-digital medium to determine if a similarity measure based on at least one of local descriptors or global descriptors of the first and second speckle patterns is at least one of equal or within a predetermined range; and convert the at least one first speckle pattern into first data and the at least one second speckle pattern into second data using a Gabor transform procedure;

with a Principal Component Analysis procedure, generate a low dimensional representation from each of the first data and the second data; and determine a further similarity measure between the at least one first speckle pattern and the at least one second speckle pattern by determining whether a particular distance between a first low dimensional representation and a second low dimensional representation is within a predetermined range, wherein the predetermined range is determined using a predetermined procedure.

\* \* \* \* \*